United States Patent [19]

Lefeuvre et al.

[11] 4,224,907
[45] Sep. 30, 1980

[54] METHOD FOR REGULATION OF THE SPEED OF AN INTERNAL COMBUSTION ENGINE AND LIMITER SYSTEM MAKING USE OF IT

[75] Inventors: Andre Lefeuvre, Noisy le Roi; Gilles Leconte, Paris; Michel Chiapello, Maisons-Laffitte, all of France

[73] Assignee: Regie Nationale des Usines Renault, Boulogne-Billancourt, France

[21] Appl. No.: 961,535

[22] Filed: Nov. 16, 1978

[30] Foreign Application Priority Data

Nov. 16, 1977 [FR] France .................. 77 34396
May 16, 1978 [FR] France .................. 78 14369

[51] Int. Cl.³ .................................... B60K 31/00
[52] U.S. Cl. .......................... 123/352; 123/360; 74/513
[58] Field of Search ........................................ 74/513

[56] References Cited

U.S. PATENT DOCUMENTS

| | | | |
|---|---|---|---|
| 3,575,256 | 4/1971 | Jania et al. | 123/102 |
| 3,580,355 | 5/1971 | Kitano et al. | 123/102 |
| 3,752,252 | 8/1973 | Sakakibara | 123/102 |
| 3,885,644 | 5/1975 | Seidler et al. | 123/102 |
| 3,891,046 | 6/1975 | Oicles | 123/102 |
| 3,983,767 | 10/1976 | Lefeuvre | 123/102 |
| 4,047,507 | 9/1977 | Noguchi et al. | 123/102 |
| 4,058,094 | 11/1977 | Moore | 123/102 |
| 4,099,592 | 7/1978 | Gonzales | 123/102 |
| 4,121,273 | 10/1978 | Jarrett et al. | 123/102 |
| 4,166,514 | 9/1979 | de Freminville et al. | 123/102 |

*Primary Examiner*—Charles J. Myhre
*Assistant Examiner*—Raymond A. Nelli
*Attorney, Agent, or Firm*—Oblon, Fisher, Spivak, McClelland & Maier

[57] ABSTRACT

A speed limiter for the regulation of the speed of an internal combustion engine wherein in addition to a first kinematic linkage chain between a manually operable acceleration pedal and an engine throttle is provided a second computer controlled kinematic linkage chain which can assume speed regulation control in such a way that the second chain can take over from the first when the first has maximally opened the throttle and without the first chain hindering the functioning of the second under the command of the computer as soon as the vehicle has entered the prescribed range of regulation. In one embodiment the second kinematic chain includes a pneumatic actuator coupled to the throttle and operable by means of the opening electrovalves as controlled by the computer in accordance with vehicle speed and acceleration. In another embodiment, the second kinematic linkage chain includes a reversible motor having a shaft rotatable under the control of the system computer.

9 Claims, 16 Drawing Figures

METHOD FOR REGULATION OF THE SPEED OF AN INTERNAL COMBUSTION ENGINE AND LIMITER SYSTEM MAKING USE OF IT

BACKGROUND OF THE INVENTION

1. Field of the Invention

The present invention relates to a method and apparatus for regulation of the speed of an internal combustion engine.

More particularly, the invention relates to a speed regulator which limits the maximum speed of a motor vehicle to an adjustable predetermined speed without the requirement of the driver watching his speedometer.

2. Discussion of the Prior Art

Numerous types of speed limiters are already known.

A first type of speed limiter opposes depression of the accelerator pedal beyond a position for which an ordered speed is attained. Such speed limiters have a drawback due to the fact that the maintenance of an ordered speed is obtained on a hilly road only by continual movement of the throttle, felt by the driver through the motion of the accelerator pedal.

Other mechanical or electromechanical speed control limiters such as those of FORD-PHILCO or V.D.O. act at the level of the carburetor. These limiters open the throttle in opposition to the conventional return spring of the accelerator, and thus assume complete control and allow the driver to take his foot off the accelerator pedal during regulation. These limiters disengage as soon as the brake or clutch pedal is depressed.

The above-described speed limiters accept as the ordered speed that attained by the vehicle at the instant the driver initiates speed control. They call for, on the part of the driver, a visual check of the speed counter if he desires assurance of the exactness of ordered speed. Most of these speed limiters have, in addition, a recopy of the throttle position, which increases their complexity and their response time.

SUMMARY OF THE INVENTION

Accordingly, it is the object of the present invention to avoid these drawbacks of the prior art.

This and other objects are achieved according to the method of the invention for regulation of the speed of the internal combustion engine of a vehicle, in particular for limitation of the maximum speed, utilizing a computer in a conventional association with a servo system, a speed sensor and a conditioning circuit for the signals produced by the speed sensor, the computer including notably a time base and a circuit generating and distributing the different command and synchronization signals to a selector circuit for an ordered speed $V_o$, to a circuit furnishing a parabolic law of opening to at least two electrovalves governing the pressure within a pneumatic actuator connected to the vacuum prevailing in the air intake manifold to the motor cylinders and to the open air, to a central calculator unit and to a display circuit as a function of an ordered speed $V_o$, the speed $V_2$ at the instant t and the speed $V_1$ at the instant $t-1$, which method is characterized by the fact that there is periodically added to the change in instantaneous speed $(V_2-V_1)$ in the preceding unit of time modified by a multiplied coefficient b, the change in speed with respect to the ordered speed $(V_2-V_o)$ and the result is multiplied by a fixed coefficient a; finally, there is added to the result a quantity c of discrete value which takes the value two or zero in accordance with a detection by the servo system of either two successive accelerations or none, so that the computer periodically adjusts the pressure level inside the actuator in acting on the degree of opening of a first electrovalve connected to a reservoir at vacuum and of a second electrovalve connecting to the open air as a function of the measured motor speed and vehicle acceleration.

One of the advantages resulting from the utilization of the method of the invention is that of permitting anticipation of the position of opening of the throttle and reacting before the ordered speed is passed or even reached. It is found, moreover, that the utilization of the method of the invention leads to a stability of regulation superior to that of all the systems of the earlier art.

In the system of the present invention, the ordered speed is preselected, displayed in advance and modifiable at any instant by way of orders internal or external to the vehicle with the help either of pushbuttons or of a sequential command supplemented by a display between, for example, 60 and 130 Km/hr.

Thus the driver wishing to bring into play the speed limiting system of the invention establishes, by means of the accelerator pedal, a certain throttle opening. The actuator intervenes then to close the throttle more or less as soon as the vehicle, by its velocity and acceleration, has entered the range of regulation. When the vehicle has reached the speed of regulation, the actuator decouples the throttle-opening control from the acceleration control by the pedal. The driver of the vehicle can continue to depress the accelerator pedal but due to the mechanical linkages which, according to the present invention, connect, on the one hand, the accelerator pedal to the throttle, on the other hand, the actuator to the throttle, the action of the driver has no effect and the system of regulation, thanks to the actuator, takes over from the driver.

If the driver desires to accelerate and thus run at a speed higher than his ordered speed, two possibilities are open to him; either he acts through his sequential command to change the maximum speed or speed of regulation whereupon the speed-limiting system of the present invention intervenes, or he can floor the accelerator pedal, which activates a switch reversing the situation (kick) connected, according to the present invention, to the computer and having the effect of opening the venting electrovalve to the atmosphere and of closing the electrovalve connected to vacuum and, consequently, of inhibiting the regulation system just at this moment.

If the driver desires to slow down and run at a speed lower than his ordered speed, it suffices for him to let up on the accelerator pedal to regain control of the throttle opening. This opening then becomes less than that necessary to maintain the ordered speed $V_o$. He can also, thanks to his sequential command, change his ordered speed to a lower one. At rest, i.e. in the unexcited state, the venting electrovalve is open while the vacuum electrovalve is closed.

The vacuum and venting electrovalves along with the actuator which intervenes in activating the present regulation system permit their advantageous combination with the "NORMALUR" (registered trademark) system, i.e. for raising the foot, which was the object of French patent applications of the present Applicant, viz. No. 73/33812 of Sept. 20, 1973 for "Vehicle Speed-Limiter System" and No. 73,33813 of Sept. 20, 1973 for "Arrangement for Return of the Accelerator Pedal of a Vehicle."

In the speed-regulation system of the invention, a suitable calculation interval is between 0.2 and 0.8 second, at the beginning of which one or the other of the electrovalves is commanded to open depending on the sign of the result of the calculation executed during the preceding interval and the time for opening each electrovalve depends on both that result and the valve opening algorithms held in memory in the computer, the time of opening of each electrovalve being at most equal to the elemental calculation interval.

It is advantageous in the speed-regulation method of the invention to take the coefficient a equal to either a half or one depending on whether the calculations are in terms of kilometers/hour or miles/hour.

Advantageously in the speed-regulation method of the invention which has means for changing the ordered speed $V_o$, following such a change, the computer forces the result of its calculation to $d=5$ during an elemental period or two of calculation and acts on the sign of the result of the calculation for two or four elemental calculation periods, this forcing taking place only if one is within a range of regulation ($-e=-4$; $+e=+4$) and the sign becoming negative if the ordered speed $V_o$ increases while the sign becomes positive if the ordered speed $V_o$ decreases.

It is advantageous in the speed-regulation method of the invention to define the range of regulation to be $-f<V_2-V_o<+f$ with $f=8$ if the calculation is in terms of kilometers/hour and $f=5$ if it is in terms of miles/hour.

Advantageously, the speed-limiter system of the invention includes a momentary two-position switch permitting sequential selection of the ordered speed $V_o$ from 5 in 5 miles/hour or from 10 in 10 kilometers/hour, prefixing the ordered speed $V_o$ with a determined starting value and precluding variance beyond two extreme lower and upper values of the selection range, and simultaneous digital or analog display of the ordered speed $V_o$, by the intermediary of the computer, in front of the driver.

Advantageously in the speed-limiter system of the invention, the computer is a microcomputer programmed to simultaneously control the opening of the electrovalves and display the ordered speed $V_o$, and connected at its inputs to the speed sensor and to the sequential command of ordered speed $V_o$.

According to the invention, the computer includes a multiplexer permitting a selection of electrovalve opening times as a function of the calculation results and the predetermined valve openings stored in the computer memory.

In another embodiment of the invention, the electrovalves and the electrovalve actuator are replaced by a reversible motor under the control of the system computer and coupled to the throttle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
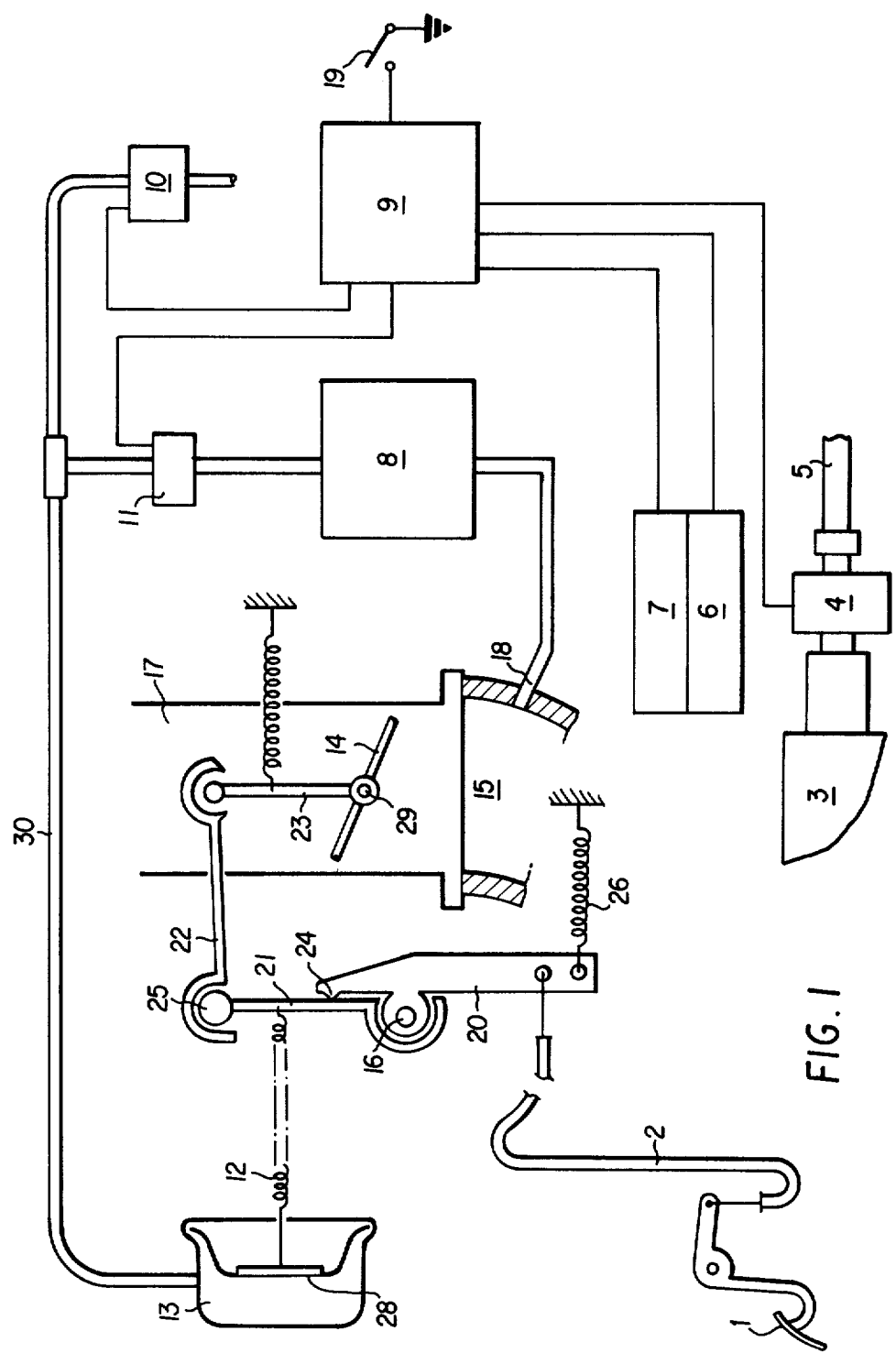
FIG. 1 is a schematic illustration of one embodiment of the speed-limiting system of the present invention.

Referring now to the drawings, wherein like reference numerals designate identical or corresponding parts throughout the several views, and more particularly to FIG. 1 thereof, the accelerator pedal 1 of a vehicle is shown tied by a cable 2 to one end of a first lever 20 pivoting about an axis 16 and terminated at its other end by a point 24 resting against a second lever 21 terminated at one end by a ball 25 and at the other by an articulation support conforming to the shape of the first lever 20 in the vicinity of the axis 16 so as to be able to pivot likewise about the axis 16. The end of the first lever 20 attached to the cable 2 is brought back to its equilibrium position by means of a first spring 26 while the second lever 21 is connected at an intermediate point by a small chain 12 to a reinforcement on the diaphragm 28 of a barometric-type vacuum capsule 13. The kinematic train is continued by a link 22 terminated at its two ends by articulation supports conforming inwardly to the shape of the ball 25 on the one hand and on the other, to the end of a control arm 23 which, by its rotations about an axis 29 at the height of its other end, commands the openings and closures of the throttle 14. The control arm 23 is returned to its position of equilibrium and rest by means of a second spring 27 which tends to open the throttle 14.

The kinematic train going from the accelerator pedal 1 to the axis 29 is entirely outside of the air intake passage 17 containing the throttle 14. The air intake passage 17 has been represented in cross section along its longitudinal plane of symmetry to show the region of vacuum 15 resulting from the opening of the throttle 14 downstream of the carburetor which has not been shown. In this vacuum region 15 there is a pressure take-off 18 connected to a first orifice of a vacuum reservoir 8. The latter is connected at a second orifice thereof to a vacuum electrovalve 11 which controls communication of the vacuum reservoir 8 with the internal volume of the vacuum capsule 13 by way of the tubing 30 when the valve receives a command from a computer 9 to which it is connected. In a similar manner, an electrovalve 10 for open air venting is connected, on the one hand, to the same tubing 30 and, on the other, to the same computer 9 which can be grounded by the intermediary of a switch 19. The switch 19, called the "kick" switch and actuated when the accelerator pedal is floored if it is desired to exceed the limiting speed, is located on the flooring of the vehicle separating the engine and passenger compartments. The computer 9 is connected in addition to an order selector 7, an on-off switch 6 and a speed sensor 4 geared to the vehicle transmission 3. A cable 5 connects the speed sensor to the vehicle speedometer.

Operation of the embodiment of the invention shown in FIG. 1 is now described.

The driver of the vehicle by depressing the accelerator pedal 1 more and more causes the throttle 14 to open further and further via the linkage train formed by cable 2, first lever 20, second lever 21, link 22 and control arm 23. The driver having previously entered into the computer 9 by means of the order selector 7 an ordered speed which the vehicle must not exceed, when the vehicle reaches this speed and tends to exceed it, the computer 9 intervenes to transmit to the electrovalves 10 and 11 for venting and connecting to the vacuum tank 8 actuation commands which depend on the most recently derived speed calculation result and which have the effect of establishing a vacuum of a particular value in the closed volume of the vacuum capsule 13. The result is that the latter, by the intermediary of a second kinematic train comprising the chain 12, the second lever 21 pivoting about the axis 16, the link 22 and the control arm 23, takes over from the driver in controlling the opening of the throttle 14 and in this manner prevents the vehicle from exceeding the ordered speed $V_o$.

An important characteristic of the invention is the automatic substitution of the vacuum capsule 13, also called the actuator, for the driver in controlling the opening of the throttle 14 under the command of the computer 9. At the same time the driver can continuously depress the accelerator if so desired as long as he avoids flooring the pedal, since this would activate the switch 19 which would result in inhibiting the entire speed-limiting system of the invention based on the utilization of the vacuum capsule 13 in connecting the latter to the open air by the intermediary of the venting electrovalve 10, the electrovalve 11 being simultaneously closed by the computer 9. The connection between the first lever 20 and the second lever 21 in the kinematic chain is realized in such a manner that it is possible to decouple acceleration from the pedal 1 and replace the driver with the regulation system based on the utilization of the actuator 13 without the least inconvenience to the driver.

If the driver lets up enough on the accelerator pedal to go below the limiting speed $V_o$, the speed limiter of the invention automatically drops out and the driver regains control of vehicle speed.

The driver has, at all times, two possiblities if he wishes to make any change in the situation existing in his vehicle with respect to limitation of its speed: either floor the accelerator pedal to activate the switch 19 or use his order selector 7 to modify the limiting speed $V_o$. In the arrangement of the invention the ordered speed $V_o$ is selected in advance and is modifiable at any time via internal commands through the order selector 7 or via commands external to the vehicle. The order selector 7 may be either a system of push buttons or a sequential command repeated by a display functioning, for example, between 60 to 130 km/hr., the computer 9 instantaneously adjusts to the new ordered speed.

Figure 2:
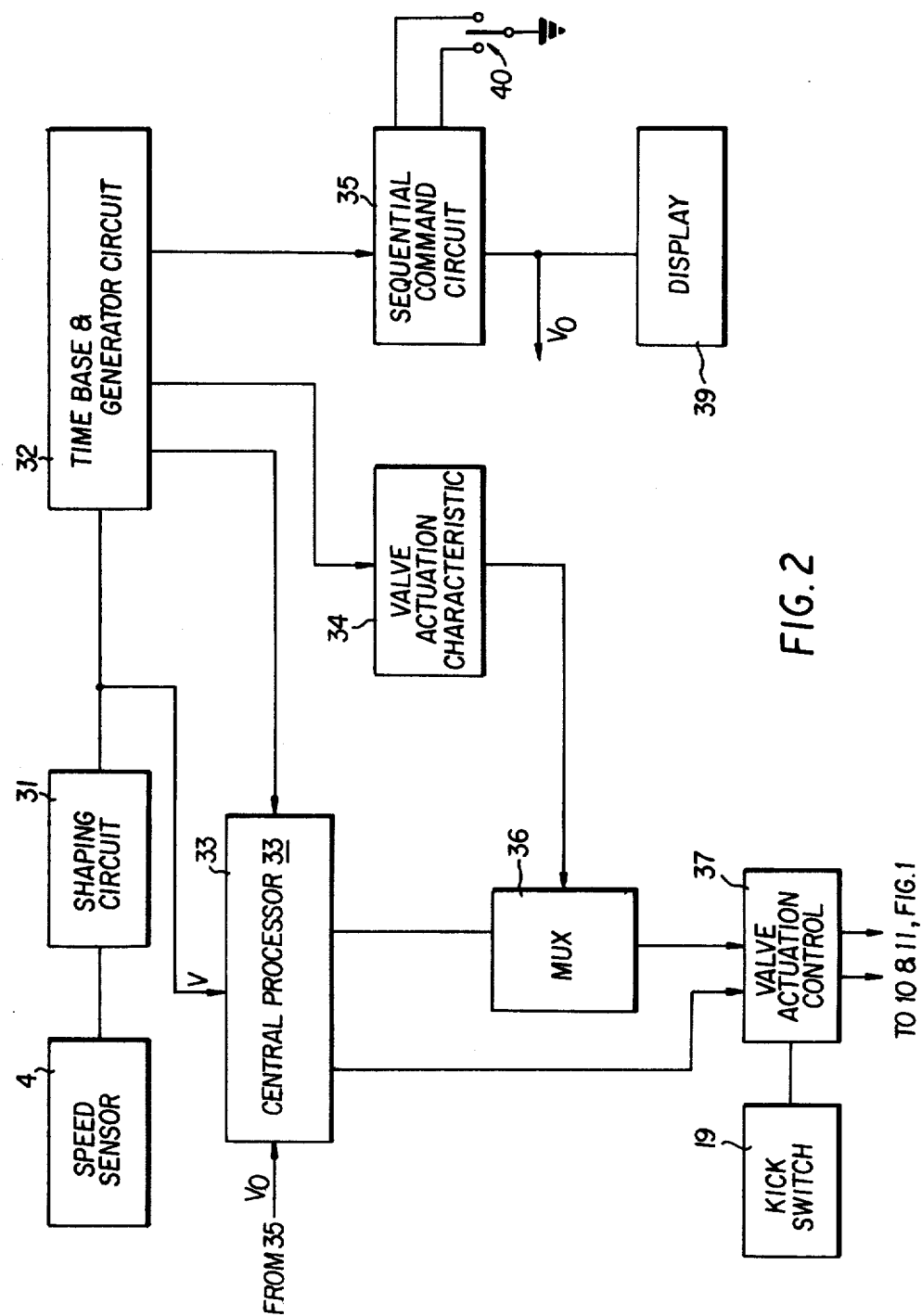
FIG. 2 is a schematic illustration of one embodiment of the computer utilized in the limiter system of FIG. 1.

According to the embodiment illustrated in FIG. 2, the computer 9 of FIG. 1 includes, starting with the speed sensor 4 already shown in FIG. 1, the series connection of a shaping circuit 31 and a circuit 32 combining a time base and a generator circuit. A sequential command circuit 35 for the ordered speed $V_o$ is connected to the circuit 32 and the output of the sequential command circuit 35 which furnishes the ordered speed $V_o$ is connected to a display 39, for example a liquid crystal display. The time base and generator circuit 32 is connected to a multiplexer circuit 36 by way of a circuit 34 reproducing the valve opening characteristics of electrovalves 10 and 11 of FIG. 1. The central unit of the computer is constituted by a circuit 33 which periodically calculates the expression:

$$X = a[V_2 - V_o + b(V_2 - V_1)] + c \qquad (1)$$

in which:

$V_o$ is the ordered speed;
$V_2$ is the vehicle speed at the instant t;
$V_1$ is the vehicle speed at the instant t−1 corresponding to the preceding measurement;
a is equal to ½ if the calculation is in km/hr and 1 if the calculation is in miles/hr;
b is equal to 3; and
c is equal to 2 if the system detects two successive accelerations and 0 otherwise.

This central calculating unit and memory 33 is connected to an output of the shaping circuit 31, on the other hand, for receiving information on the vehicle speed and, on the other, to the time base and generator circuit 32, and finally to the output of the sequential command circuit 35 to receive the ordered speed $V_o$. The central calculating and memory unit 33 is connected via one output to the multiplexer 36 for communicating thereto the results of the calculations according to equation (1) above, and via a second output to the circuits 37 for controlling the electrovalves. The latter correspond to the blocks 10 and 11 in FIG. 1. The "kick" switch 19 is connected to the circuit 37 and a switch 40 is connected in shunt to the sequential command 35 for making the speed selection.

For commanding the electrovalves 10 and 11 of FIG. 1, one establishes an equation involving both the vehicle's speed and its acceleration so as to be able to act with anticipation, given that the measurement arrived at by means of the sensor 4 is a relatively slow one since the sensor 4 delivers only 5 pulses per meter traveled.

The measurement period is 0.72 second. One uses, then, an equation (1) depending on the deviation between the actual speed $V_2$ of the vehicle at the instant t, on the one hand, and the ordered speed $V_o$, on the other, reduced by the acceleration, i.e. the difference between the acutal speed $V_2$ of the vehicle at the instant t and the speed $V_1$ recorded in the preceding measurement at the instant t−1. The equation utilized in the central calculating unit 33 is therefore of the form:

$$2x = V_2 - V_o - (V_1 - V_2) \cdot \Gamma$$

where $\Gamma$ is a constant with the value 2.16/0.72 or:

$$2x = V_2 - V_o - 3(V_1 - V_2) = 4V_2 - (V_o - 3V_1).$$

The actual result obtained thanks to the electronic circuit 33 is half this quantity apart from the sign, or:

$$X = \tfrac{1}{2}(V_o + 3V_1 - 4V_2) = \tfrac{1}{2}(V_o + 3V_1) - 4/2 V_2 \qquad (2)$$

in the case where the calculation is in terms of km/hr and c=zero.

The computer 9 is of the digital type. It furnishes whole numbers lying between zero and a maximum value with a positive or negative sign according to circumstances.

The computer then commands the opening times of the electrovalves via circuit 37 as a function of the absolute value and sign of X, a certain valve opening characteristic furnished by the circuit 34, and the selection of the ordered speed by means of the sequential command obtained via circuit 35.

For realizing the sequential command of several stable states, one utilizes a switch 40 with two momentary positions commanding a delay circuit which furnishes clock pulses with leading edges and delayed trailing edges to a sequencer circuit with (n+1) outputs ($S^o$ to $S^n$), one of these outputs being excited to apply voltage to the circuit, the sequence of excitation of the outputs being done in one direction or other from the preferred output with blocking at the end of the sequence, at $S^o$ or $S^n$. Such a circuit has been described in detail in the French patent application No. 75/35636 filed Nov. 21, 1975 (publication no. 2332656) by the present Applicant for "Sequential Command for Motor Vehicle Headlights."

The central calculating and memory unit 33 comprises three stages of which the first two stages calculate the absolute value of the equation (1) or (2), a supplement to the second stage furnishing the sign, and the third stage stores the result of the calculation of the absolute value of equation (1) or (2) in memory. The first stage effects the operation $\tfrac{1}{2} V_o + 3/2\, V_1$ utilizing an up-down counter and the second stage, with a second identical up-down counter, adds $-2V_2$ to it, the generator circuit 32 piloting these three stages.

A more detailed description is now presented with the help of FIGS. 3 to 8.

Figure 3:
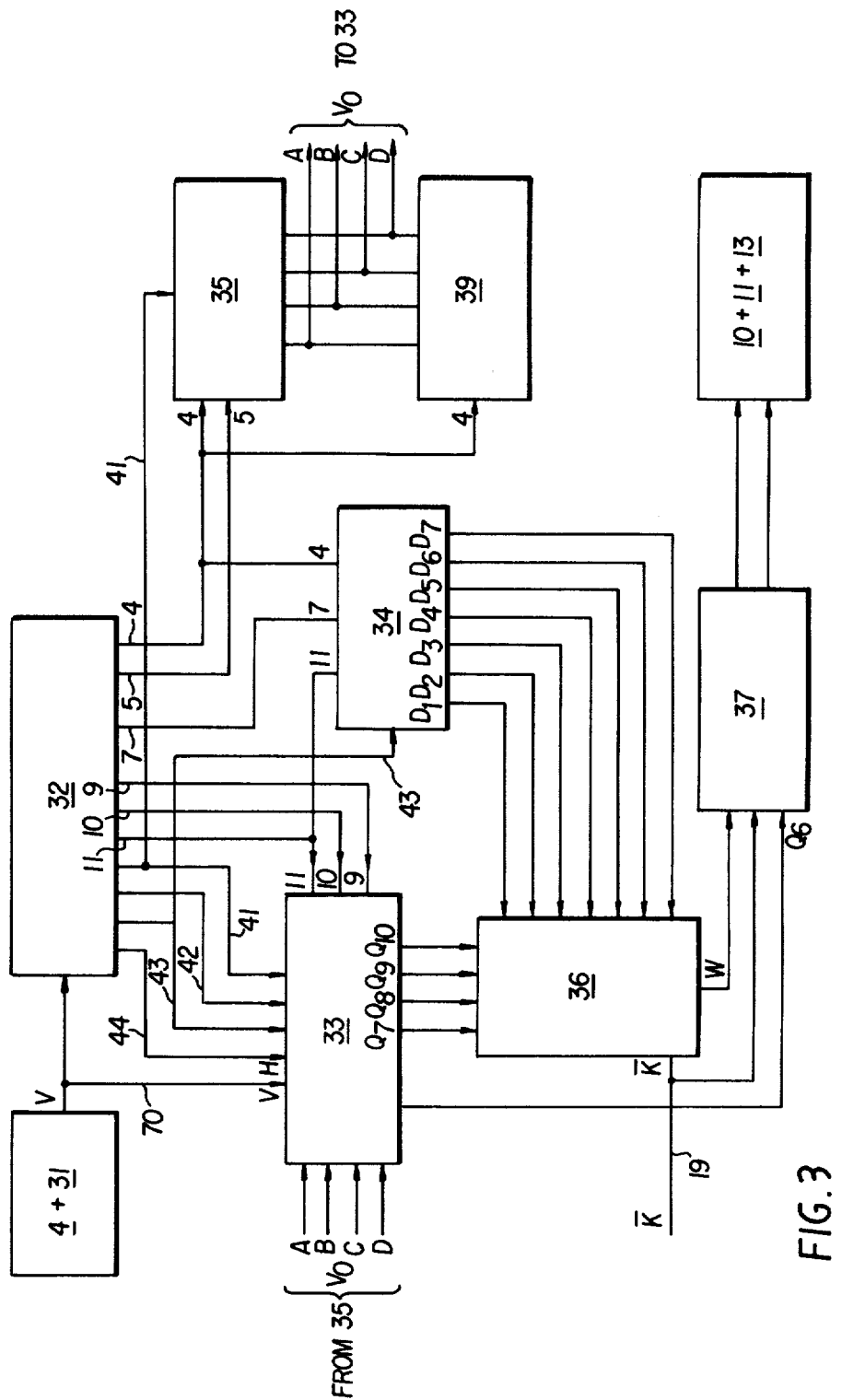
FIG. 3 is a schematic illustration of the routing of the different signals between the different circuits involved in the speed servo system according to the invention.
Figure 6:
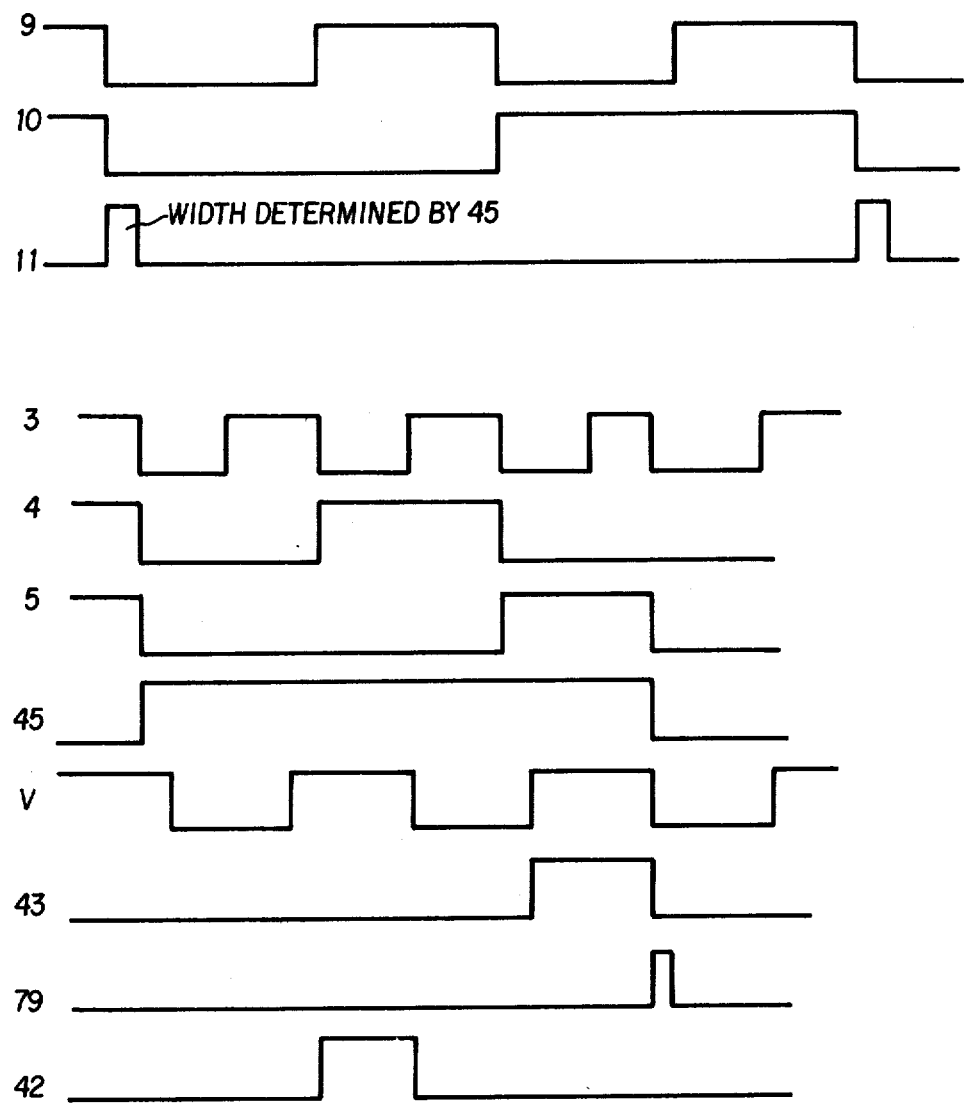
FIG. 6 is a timing diagram for the signals generated in the circuit of FIG. 4.

FIG. 3 is a more detailed diagram of the block diagram of FIG. 2. A single block 4+31 represents the combination of the input speed sensor 4 and the shaping circuit 31 of FIG. 2. From the circuit 31 comes the information concerning the instantaneous speed V of the vehicle, information which is transmitted, on the one hand, to the circuit 32 forming the time base and generator circuit and to the central calculating and memory unit 33, on the other. The time base and generator circuit 32 represented in detail in FIG. 4 comprises a monostable multivibrator 45, a circuit 46 generating a prepositioning signal 41, a clock 47 producing a signal H and a 12-stage counter 48 of which only the first eleven stages are utilized. This counter, of type 4040 in the MOTOROLA catalog, functions as a frequency divider, i.e. if one considers the successive signals that can be taken from the outputs of each of its twelve stages, the frequency of the output of a given stage is half that of the output of the immediately preceding stage and twice that of the output of the immediately following stage. The signals used are those coming from stages 3 to 11 and are designated by their respective stage numbers. These signals are found in particular in FIG. 4 and in the timing diagram of FIG. 6 are also shown some of these signals. FIG. 3 shows that the signals from stages 4 and 5 of the counter 48 of the generator circuit 32 are directed to the circuit 35 for selection of the speed $V_o$. The signal from stage 4 also is applied to the display circuit 39 and the circuit 34 governing the valve opening characteristics of the electrovalves. This circuit 34 also receives the signals leaving stages 7 and 11 of the counter 48. The central calculating and memory unit 33 receives, on the one hand, the signals leaving stages 9, 10 and 11 of the counter 48 of FIG. 4; it receives, on the other hand, the signal H or 44 emitted by the time base 47 of FIG. 4. In addition, the unit 33 receives the prepositioning signal 41 from the output of circuit 46 of FIG. 4; a "preset" signal 42 produced by an AND logic gate 49 shown in FIG. 4 from the signals $\bar{3}$, 4, $\bar{5}$ and 11 of the counter 48 for the second up-down counter stage of the central calculating unit 33; and finally, a "reset" signal 43 which induces the loading of the first counter stage of the central calculating unit 33. The signals 42 and 43 are shown on the last line and the third from last line, respectively, of FIG. 6. The "reset" signal 43 is generated by means of an OR logic gate 50 shown in FIG. 4 from signals coming from the monostable multivibrator 45 and the circuit 46, the generator of the prepositioning signal 41, prepositioning taking place upon application of voltage.

The central calculating and memory unit 33 also receives as inputs, signals A, B, C, D indicative of the binary value of the ordered speed $V_o$ furnished as the output of the selection circuit 35. This information is likewise communicated to the display circuit 39.

Figure 5:
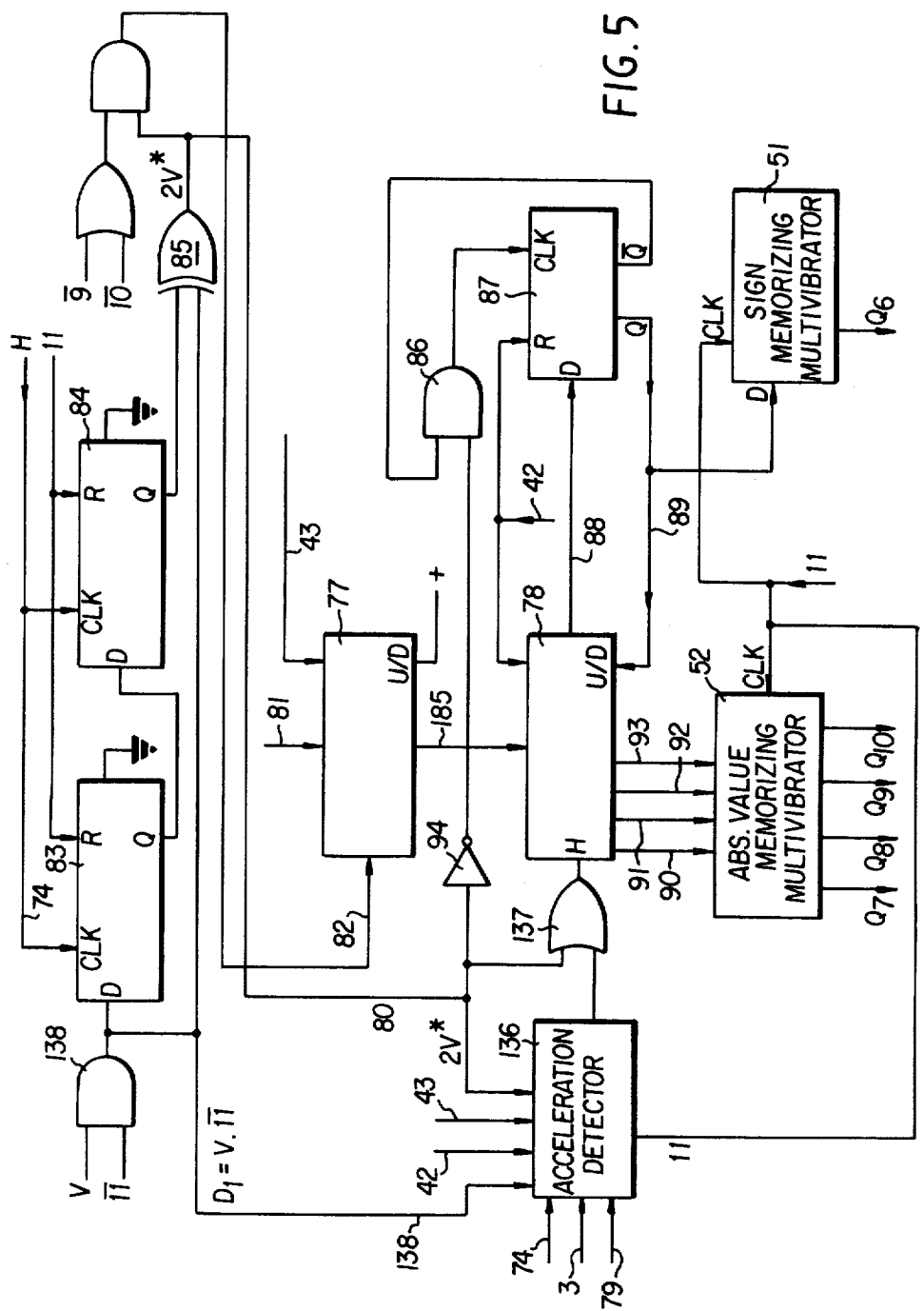
FIG. 5 is a block diagram of one embodiment of the calculation and memory portions of FIG. 2.
Figure 11:
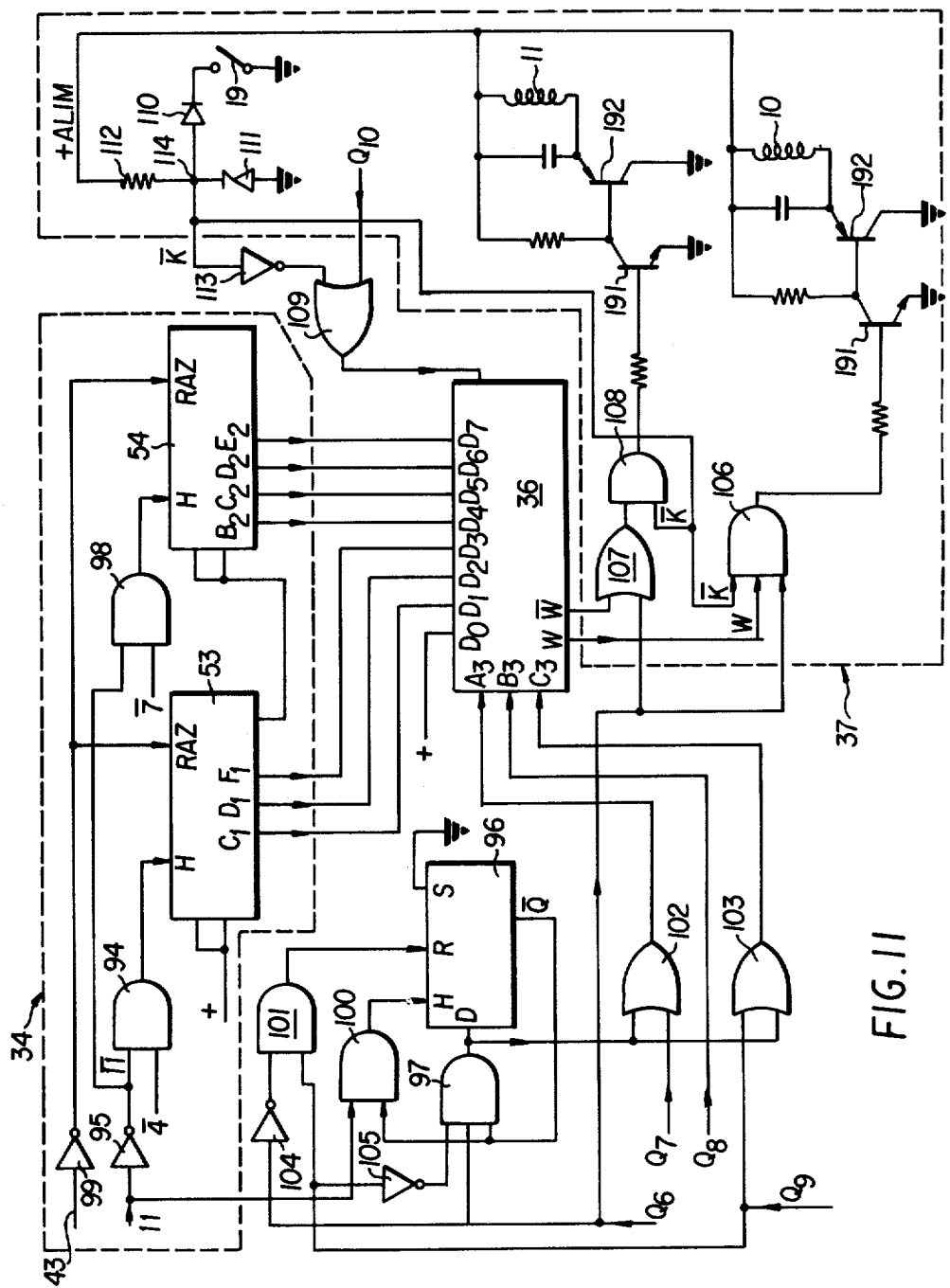
FIG. 11 is a circuit diagram of one embodiment of the electronic circuits corresponding to the multiplexer, to the regulation of valve opening and to the command of the electrovalves of FIG. 2.

The central calculating and memory unit 33 which is illustrated in greater detail in FIG. 5 has notably at its output a sign memorizing multivibrator 51 with a noninverting output $Q_6$ and a set 52 of absolute-value memorizing multivibrators with noninverting outputs $Q_7$ to $Q_{10}$. Returning to FIG. 3, the output $Q_6$ is connected as a direct input to the electrovalve command circuit 37 and the outputs $Q_7$ to $Q_{10}$ are connected to a first set of inputs to the multiplexer circuit 36 which is connected via a second set of inputs to a set of parallel outputs $D_1$ to $D_7$ of the circuit 34 giving the valve opening characteristic of the electrovalves. FIG. 11 which illustrates a circuit implementation of the circuit 34 shows that the latter essentially comprises two shift registers 53 and 54 of type 74 C164 in the NATIONAL SEMICONDUCTOR catalog, the first 53 giving rise to the signals $D_1$, $D_2$, $D_3$ and the second 54, the signals $D_4$ to $D_7$.

Returning to FIG. 3, the multiplexer circuit 36 also receives a signal from the "kick" switch 19 actuated when the accelerator pedal is floored, and outputs a signal W and its inverse $\overline{W}$ to the circuit 37 which commands the opening of the electrovalves.

The functioning of the apparatus will be made clear in the description of the figures below.

Figure 4:
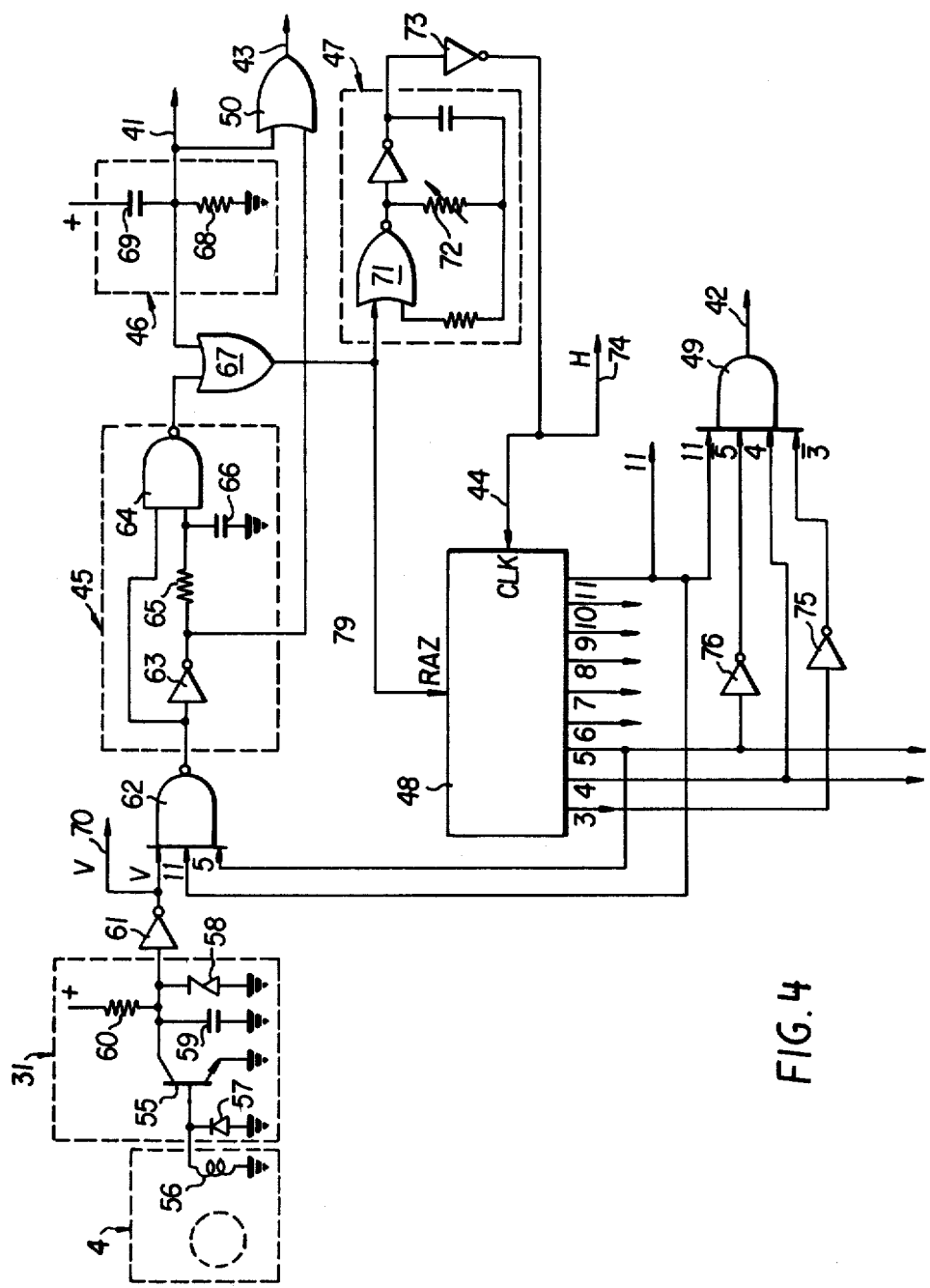
FIG. 4 is an illustration of one embodiment of the time base and the signal-generating circuit according to the invention.

FIG. 4 which illustrates a circuit implementation of the time base and generator circuit 32, shows at the extreme left a speed sensor 4 consisting of a tachymetric generator with eight pole pairs, which may be a JAEGER "ALTRA-4" (registered trademark) sensor or a FORD tachymetric generator of type D4AF-9 E731. These, of course, are only mentioned for the sake of examples. According to the American standard, a complete rotation of the sensor 4, i.e. one turn of the speedometer cable, corresponds to a travel of 1.609 meters, which corresponds to five pulses per meter which are produced in the winding 56 of the sensor 4 as opposite poles of the magnets pass by it. These pulses are shaped in the circuit 31 which contains a transistor 55, the base of which is connected to one end of the winding 56. Shunted across the winding is a diode limiter 57, the forward direction of which is from ground to the base of transistor 55. The emitter of transistor 55 is grounded while its collector is connected to a NAND logic gate 62 by way of a logic inverter 61. To this emitter, to complete the shaping circuit 31, are connected a resistor 60 connected to positive supply voltage, and a parallel combination of a capacitor 59 and a ZENER diode 58 grounded at the opposite ends thereof. In the JAEGER ALTRA-4 are incorporated, besides the tachymetric generator 4, the diode 57 and the NPN transistor 55. At the output of the logic inverter 61, a branch 70 transmits the signals V, after their shaping, to the central calculating and memory unit 33 as has been seen in FIG. 3. Returning to FIG. 4, applied to two additional inputs of the NAND logic gate 62 are the outputs of stages 5 and 11 of the counter 48. The output of gate 62 is connected to a resistor 65 of the monostable multivibrator 45 by the intermediary of a logic inverter 63. The other end of resistor 65 is connected as a first input to a two-input NAND logic gate 64, the second input of which is connected directly to the output of the logic gate 62. The output of gate 64 is applied to one input of an OR logic gate 67, the second input of which is tied to the circuit 46, i.e., the prepositioning signal 41, at a junction of a capacitor 69, the other side of which goes to positive supply voltage, a resistor 68 grounded at its other end. The lead carrying the prepositioning signal 41 is also connected as a first input to an OR logic gate 50, the second input to which is derived from the logic inverter 63 contained in the monostable multivibrator 45. The gate 50 at the output thereof furnishes the "reset" signal 43 for the first counter stage 77 (FIG. 5) of the central calculating unit 33. The monostable multivibrator 45 also includes a capacitor 66 connected between ground and the output end of resistor 65. The output of the OR logic gate 67 is connected, on the one hand, to the input of the zero reset of the twelve stage counter 48 and, on the other, to an input to a NOR logic gate 71 of the time base circuit 47 which has a conventional structure and does not need to be described other than to emphasize that it runs constantly and that it contains a variable resistance 72 permitting adjustment of the operating frequency of the time base 47. The output of the latter is connected via a logic inverter 73 to the clock input of the twelve-stage counter 48 and a branch 74 carries this clock signal H to the frequency doubling circuit in FIG. 5. Finally, at the bottom of FIG. 4 is shown the twelve-stage counter 48 of which only the first eleven stages are utilized. An AND logic gate 49 is connected via its inputs directly to the outputs of stages 4 and 11 of the counter 48 and indirectly to the outputs of stages 3 and 5 by the intermediary of logic inverters 75 and 76 respectively, to furnish at its output 42 the "preset" or rearming signal for the second stage of the up-down counter 78 (FIG. 5) of the central calculating unit 33.

Turning now to FIG. 6, which shows the timing diagram relative to the principal signals of the generator and counter circuit 48 of FIG. 4, on the first three lines thereof is represented the signals generated, respectively, by stages 9, 10 and 11 of the counter 48. On the next three lines are represented in a similar manner, on another scale, the signals generated, respectively, from stages 3, 4 and 5 of the counter 48. On line 7 is shown, under the reference 45, the enlarged corresponding part of the signal from stage 11 given on line 3. On line 8 there is represented the form of the signal V which is obtained in FIG. 4 at the output of the shaping circuit 31. On line 9 is seen the rearming signal 43 which is produced at the output of the OR logic gate 50 of FIG. 4 for the first counter stage 77 of the central calculating unit 33. On line 10 is shown the zero reset signal 79 for the counter 48 from the output of the OR logic gate 67 of FIG. 4. Finally, on the last line of FIG. 6 is shown the signal 42 generated by the AND logic gate 49 of FIG. 4, which is an initial rearming signal for the second up-down counter stage 78 of the central calculating unit 33.

Given the characteristics of the sensor 4 discussed during the description of FIG. 4, and the different elements forming the generator circuit of FIG. 4, the time separating two successive pulses coming from stage 11 of the counter 44 is 0.72 seconds, the time during which the central calculating unit 33 executes a partial calculation. The NAND logic gate 62 in FIG. 4 realizes the synchronization of the time base 47 by the signal from sensor 4: when the signals coming from stages 5 and 11 of the counter 48 are at a level "one," the first falling edge of the speed signal V is awaited to reset to zero or reinitialize the time base 47 and the counter 48. It is this operation that the signals represented on lines 6, 7, 8 and 10 of FIG. 6 illustrate. It is seen that, if the signals 5 and 45 (enlargement of 11) are at the level "one" at the first falling edge of V, the result is the production of a pulse at the output of the OR logic gate 67 on the lead 79 (FIG. 4) for the reinitialization of the counter 48 and to the NOR logic gate 71 for the resynchronization of the time base 47.

FIG. 5 illustrates in block-diagram form a circuit implementation of the calculating and memory portion indicated in FIG. 3 by the reference 33. As has already been explained, the calculation of equation (2) is executed in two steps. The first, utilizing a first up-down counter 77, performs the operation $\frac{1}{2} V_o + 3/2 V_1$. The second step utilizes a second up-down counter 78 identical to the first. This second up-down counter adds $-(4/2 V_2+c)$ to the preceding result, the absolute value of this latter quantity being available on the lead 80.

In the first up-down counter 77, the value $\frac{1}{2} V_o$ is loaded via an input 81 then counting is performed during $\frac{3}{4}$ of the base period, which is 0.72 second as already stated, on a double frequency 2 V introduced at an input 82. For this doubling of frequency there is used a shift register with two stages 83 and 84 with an EXCLUSIVE OR logic gate 85 at the noninverting output Q of the second state 84. The two shift registers 83 and 84 each consist of half a multivibrator of type D made by NATIONAL SEMICONDUCTOR and listed in its catalog under the reference 4013. With regard to such a multivibrator, the signal appearing at the input D thereof is transferred to its output Q thereof in coincidence with a rising edge of the clock signal H; the setting to one (set) and to zero (reset) is done at a high level of the corresponding signal, i.e. of the "set" or "reset" signal.

The result obtained at the output 185 of the first stage 77 is loaded in turn by the lead 185 into the second stage 78 which counts down at the doubled frequency 2 $V^* = \frac{1}{2} \cdot 4V_2$ (if c=0) introduced by the lead 80 coming from the frequency-doubles stage 83, 84. If the up-down counter 78 passes through the value zero before the end of the measurement, the fact is communicated to a multivibrator 87 of type D by a lead 88. The multivibrator 87 reacts by giving the order via a lead 89 connected to its noninverting output Q and going to the second up-down counter 78 to continue the counting of the remaining part of 2 $V = \frac{1}{2} \cdot 4V_2$. There is thus obtained at the absolute value of equation (1) at the outputs 90 to 92 of the second stage 78 and, due to the multivibrator 87, the sign of the result of the calculation. Storing of the absolute value of the calculation result is effected in a memory 52 at the rising edge of the signal 11 applied to the clock input thereof and coming from the corresponding stage of the counter 48 of the system time base. The three least significant bits of the result are stored via the input leads 90 to 92, which causes indications on the output leads $Q_7$, $Q_8$ and $Q_9$ of an absolute value of X lying between zero and seven. If the absolute value is greater than or equal to eight, an indication is likewise transmitted on input line 93 to the memory 52 and an indication is then present on its output lead $Q_{10}$. The information on the sign stored in the multivibrator 51 is available on its output lead $Q_6$.

The operation of the first up-down counter stage 77 is commanded by the rearming signal 43 arriving at the loading input of the stage 77. The operation of the second up-down counter stage 78 and its associated type D multivibrator 87 is commanded by the initial rearming (preset) signal 42 arriving both at the loading input of stage 78 and at the zero-reset input of the type D multivibrator 87. Finally, the functioning of the memories 52 and 51 is commanded by the rising edge of the signal 11, the signals 43, 42 and 11 being generated in the time base and generator circuit shown in FIG. 4. The proper functioning of the second up-down counter stage 78 and its associated multivibrator is also assured by the presence of an AND logic gate 86 connected at its output to the clock input of the multivibrator 87, at one of its inputs to the inverting output $\overline{Q}$ of the said multivibrator and at its second input to the output of the EXCLUSIVE OR logic gate 85 via a logic inverter 94. The first up-down counter stage 77 as well as the second up-down counter stage 78 may consist of the series association of a 10-count decimal up-down counter of type 4510 and two type 4516 16-count binary up-down counters. The memory 52 storing the absolute values may be of type 74 C175. The multivibrators 87 and 51 may each consist of a half-multivibrator of type D listed as 4013 in the NATIONAL SEMICONDUCTOR catalog.

According to the invention, the calculating and memory stage 33 shown in FIG. 5 is completed by a supplementary stage 136 permitting detection of whether, in the course of two successive partial calculations, two successive accelerations occur, which leads to the addition or not of two pulses at the clock input H of the second up-down counter stage 78. To this end the output of the stage 136 for detecting possible accelerations is connected to the H input of the up-down counter 78 via an OR logic gate 137 to one input of which is connected the lead 80 which is also connected to the output of the frequency-doubler stage 83, 84. The acceleration detector stage 136 is connected at its inputs: to the lead 80 tied to the output of the frequency-doubler stage 83, 84; to the lead 42 carrying the reinitialization signal; to the lead 43 carrying the rearming signal; to the input 138 of the frequency-doubler stage 83, 84; to the lead 74 carrying the clock signal; to the lead 79 carrying the zero reset signal for the counter 48 of FIG. 4; and finally, to the outputs of stages 3 and 11 of the counter 48.

Figure 7:
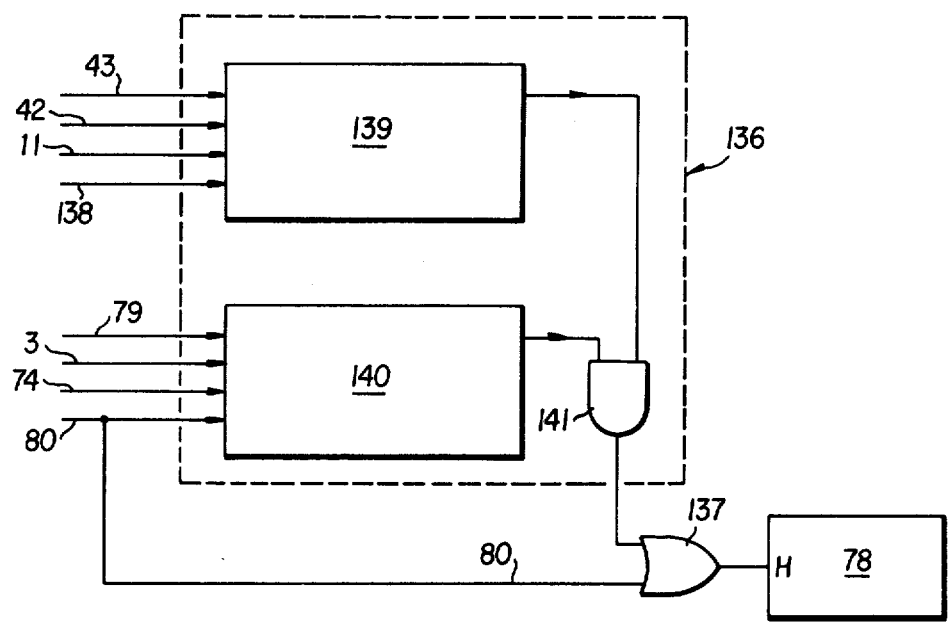
FIG. 7 is a block diagram of the portion of the computer in FIG. 5 concerned with the treatment of accelerations.

FIG. 7 shows that the stage 136, the acceleration detector, includes a first stage 139 of detection of two successive accelerations connected at its inputs: to the lead 42 carrying the reinitialization signal; to the conductor 43 carrying the rearming signal; to the output of stage 11 of the counter 48; and to the input 138 of the frequency-doubler circuit 83, 84 carrying the signal $V \cdot \overline{\text{II}}$. Stage 136 also includes a second stage 140 of detection of the two first pulses which is connected at its inputs: to the lead 79 for the zero-reset of the counter 48; to the output of stage 3 of the counter 43; to the lead 74 carrying the clock signal H; and to the lead 80 tied to the output of the frequency-doubler stage 83, 84 by way of the EXCLUSIVE OR logic gate 85. The outputs of the stages 139 and 140 are connected to the inputs of an AND logic gate 141, the output of which is connected to an input of the OR logic gate 137 previously described above.

Starting from the general formula:

$$X = a[V_2 - V_o + b(V_2 - V_1)] + c \qquad (1)$$

which for a calculation in km/hr calls for taking $a = -\frac{1}{2}$; $b = 3$ and $c = 4$ if at least two successive accelerations are detected and $c = 0$ otherwise, there is determined in the first stage 77 of the computer $\frac{1}{2} V_o + 3/2 V_1$ while, in the second stage 78 is obtained $-(4/2 \, V_2 + c/2)$ while two pulses are to be added or not to the clock input H of the second up-down counter 78.

Figure 9:
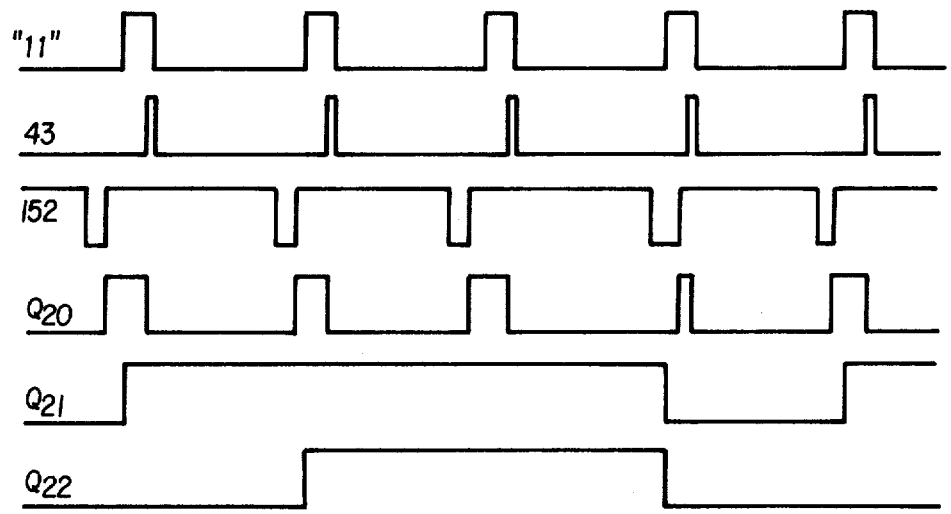
FIG. 9 is a timing diagram for the signals of the circuit of FIGS. 7 and 8 relating to the detection of acceleration.
Figure 8:
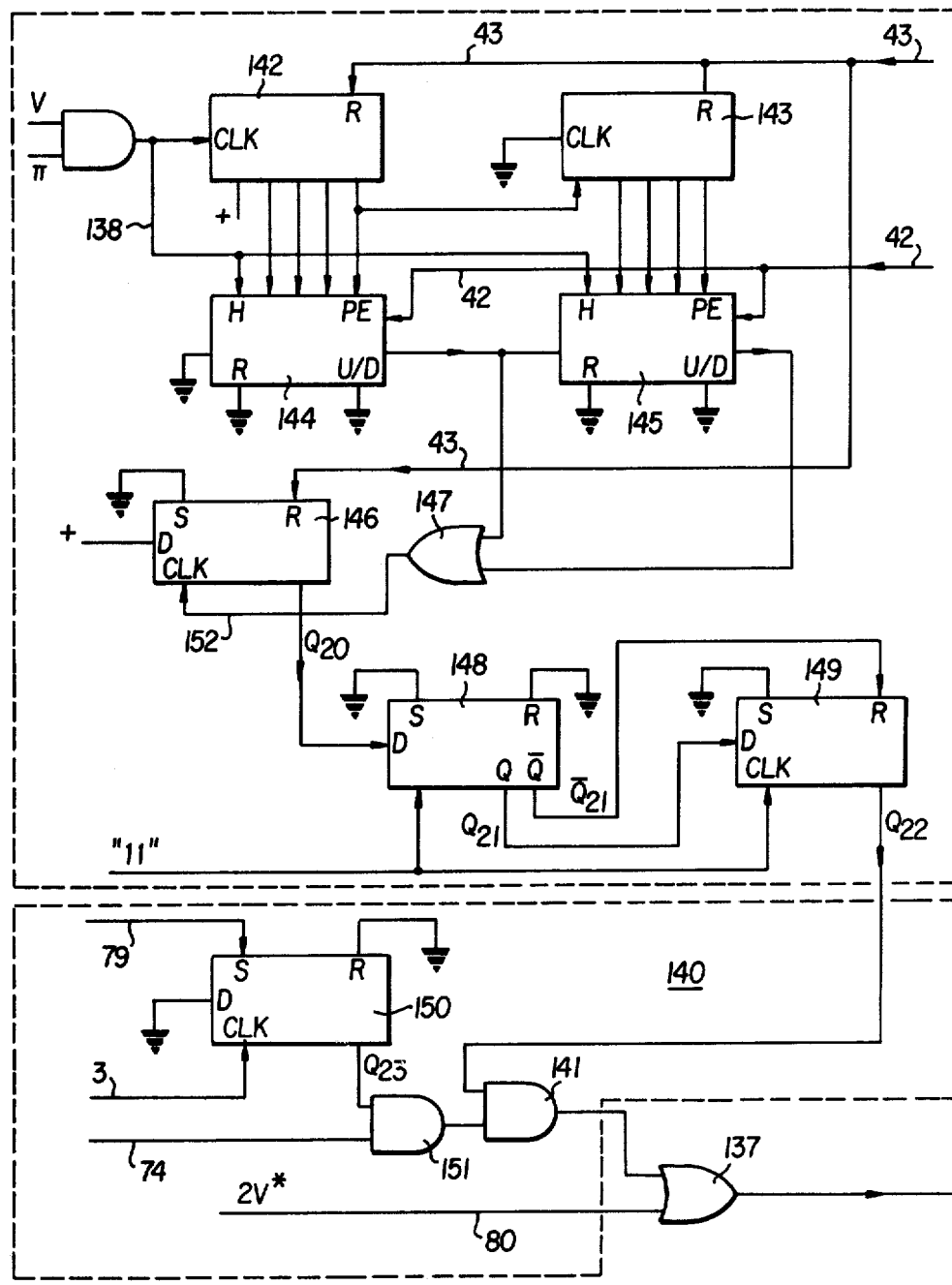
FIG. 8 is a detailed circuit diagram of the circuit of FIG. 7.

FIG. 8 illustrates a detailed circuit implementation of the supplementary stage 136 of FIG. 7. The stage 139 for the detection of two successive accelerations comprises two binary counters 142 and 143 mounted in series, two up-down counters 144 and 145 likewise mounted in series, and a multivibrator 146 of type D connected via its clock input and a lead 152 to the outputs of the two up-down counters 144 and 145 by the intermediary of an OR logic gate 147. The noninverting output $Q_{20}$ of the multivibrator 146 is connected to the input of a first memory multivibrator 148 of type D connected at its noninverting output to the input of a second memory multivibrator 149 of type D connected in series and by its inverting output $\overline{Q}_{21}$ to the zero-reset input of the second memory multivibrator 149. The principal signals of this stage 139 are illustrated in FIG. 9 where is seen in succession: on line 1, the signal 11 from the output of stage 11 of the counter 48 in FIG. 4; on line 2, the rearming signal 43; on line 3, the signal 152 arriving at the clock input of the multivibrator 146; on line 4, the signal appearing at the output $Q_{20}$ of the multivibrator 146; on lines 5 and 6, the signals appearing at the noninverting outputs $Q_{21}$ and $Q_{22}$ respectively, of the memory multivibrators 148 and 149.

This circuit of FIG. 8 functions as follows. Firstly, the speed pulses V are counted during the period "11" in the two binary half-counters 142 and 143 of type 4520 mounted in series. Then the result $V_1$ obtained is loaded in the two up-down counters 144 and 145 of type 4516 and $V_2$ is down-counted from this value. If there is an underflow, i.e. passage through the value zero, this information is stored in the multivibrator 148 of type D. Thus $Q_{21}$ is equal to one if $V_2$ is greater than $V_1$; there is in this case acceleration corresponding to $V_2$ at the instant t and to $V_1$ at the instant t−1. The multivibrator 149 likewise of type D permits shifting of the information $Q_{21}$ and its output $Q_{22}$ goes to a level one, if there are two successive accelerations. If there is no further acceleration, the two multivibrators 148 and 149 return to the level zero at the respective outputs $Q_{21}$ and $Q_{22}$.

Figure 10:
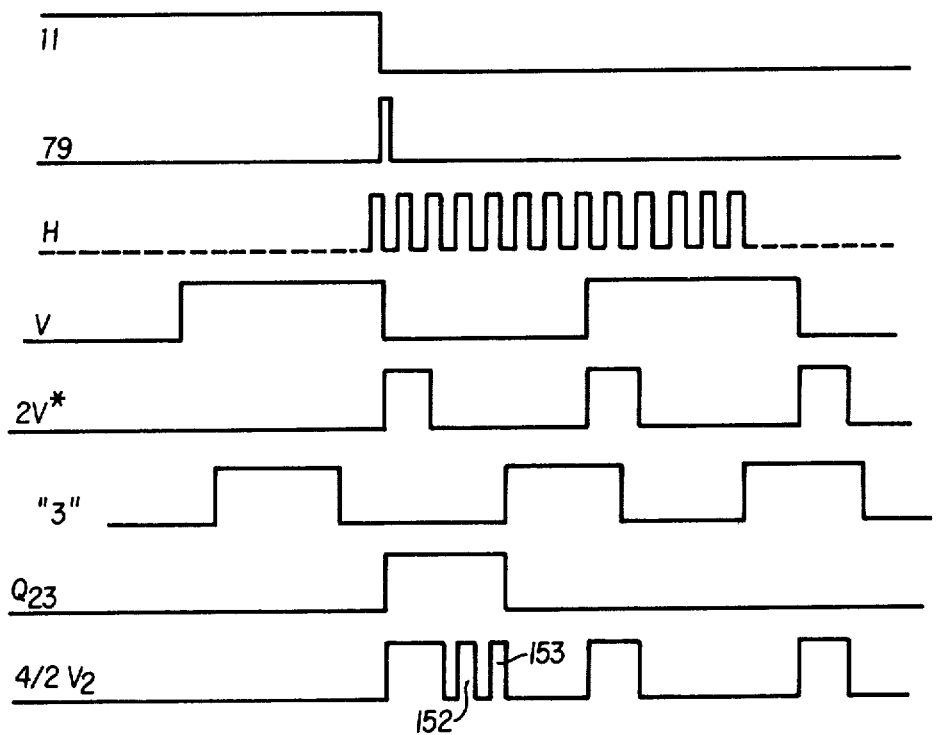
FIG. 10 is a timing diagram for signals of the circuit of FIGS. 7 and 8 relating to the detection of acceleration and the adding of two supplementary pulses.

The lower part of FIG. 8 illustrates a realization of the stage 140 for the detection of the first two pulses and the adding of two supplementary pulses to the quantity 2V by the intermediary of the OR logic gate 137 when two successive accelerations have been detected in the stage 139 and, consequently, the signal at the output $Q_{22}$ of the multivibrator 149 is at the level one. This detector stage 140 consists essentially of a multivibrator 150 of type D which may be identical to the multivibrator 146, 148 and 149 of stage 139. This multivibrator 150 is set to one by the signal carried on lead 79, i.e. the zero-reset signal of the counter 48 in FIG. 4 and falls back to zero at the first rising edge of the output signal from stage 3 of the counter 48 in FIG. 4, which is applied to the clock input of multivibrator 150. This permits isolating four pulses at the output of an AND logic gate 151 connected by its inputs, on the one hand, to the lead 74 carrying the clock signal H and, on the other, to the output $Q_{23}$ of the multivibrator 150. If there are two successive accelerations, the output $Q_{22}$ of the multivibrator 149 being at one, the succession of an AND logic gate 141 and the OR logic gate 137 situated at the input of the second up-down counter stage 78 permits the addition of only two pulses to the original signal 2V.* FIG. 10 shows the principal signals involved in the functioning of the stage 140 for detection of the first two pulses. There is seen in succession: on line 1, the signal from stage 11 of the counter 48 of FIG. 4; on line 2, the zero-reset signal 79 for the said counter 48; on line 3, the clock signal H; on line 4, the speed signal V; on line 5, the signal corresponding to two times V; on line 6, the signal obtained at the output of the third stage of the counter 48; on line 7, the signal appearing at the noninverting output $Q_{23}$ of the multivibrator 150; and on line 8, the signal 4/2 $V_2$+c appearing at the output of the OR logic gate 137. It is clearly seen that the first wide pulse of the signal 4/2 $V_2$+c is followed immediately by two supplementary pulses 152 and 153.

FIG. 11 illustrates a circuit implementation of the electronic circuits corresponding to the multiplexer 36, the circuit 34 governing the valve opening characteristics of the electrovalves, and the circuit 37 commanding the electrovalves.

To realize the valve opening characteristic of the electrovalves in the circuit 34, two series-parallel shift registers 53 and 54 mounted in series are utilized. These shift registers may be of type 74C164, for example, the first 53 receiving at its clock input the sum of the signals $\overline{4}$ and $\overline{11}$ by way of an AND logic gate 98 and the logic inverter 95. The zero-reset inputs are connected to the signal 43 via a logic inverter 99. As before, the signals 4, 7 and 11 are obtained at the outputs of the corresponding stages of the counter 48 of FIG. 4 and the rearming signal is produced likewise in the generator circuit of FIG. 4.

The signals taken from the outputs of stages C, D, F of the first shift register 53 and stages B, C, D, E of the second shift register 54 are fed in parallel to a set of inputs of the multiplexer 36, inputs designated respectively by $D_1$, $D_2$, $D_3$, $D_4$, $D_5$, $D_6$ and $D_7$. The multiplexer 36 may be of the type 74C151 in the NATIONAL SEMICONDUCTOR catalog.

With the circuit 34 governing the valve opening characteristic of electrovalves 10 and 11 are associated a multivibrator 96 and an AND logic gate 97 which serve to detect the first regulation corresponding to the first passage of the result X of the calculation to the value zero from the moment when it has passed through a value less than at least four in order to modify the result at the first measurement in such a way as to act more rapidly on the throttle 14. The output $Q_6$ of the sign memory 51 of FIG. 5 is connected in parallel to one input to an AND logic gate 101 by the intermediary of a logic inverter 104, to an input of an AND logic gate 97 the output of which is connected to the input D of the multivibrator 96, to one input of an OR logic gate 107, and finally to a first input to a three-input AND logic gate 106 commanding the opening of the electrovalve 10.

One of the outputs $Q_9$ of the absolute value memory 52 of FIG. 5 is connected in parallel to a second input of the AND logic gate 101, the output of which is tied to the zero-reset input of the multivibrator 96, to a second input of the AND logic gate 97 via a logic inverter 105, and finally to a first input of an OR logic gate 103 which is connected by its output to an input $C_3$ of the multiplexer 36.

The outputs $Q_8$ and $Q_7$ of the absolute value memory 52 of FIG. 5 are respectively connected to an input $B_3$ of the multiplexer 36 to a first input of an OR logic gate 102, the output of which is tied to an input $A_3$ of the multiplexer 36. The output $Q_{10}$ of the absolute value memory 52 of FIG. 5 is connected to a first input of an OR logic gate 109 tied by its output to the inhibiting or strobe input of the multiplexer 36. The clock input of the multivibrator 96 is connected to the output of an AND logic gate 100 which is tied via one of its inputs to the output of stage eleven of the counter 48 of FIG. 4 and via its second input to the inverting output $\overline{Q}$ of the multivibrator 96, this inverting output $\overline{Q}$ being likewise connected to a third input of the AND logic gate 97 associated with the multivibrator 96. The output of the logic gate 97 is connected in parallel, on the one hand, to the input D of the multivibrator 96, and on the other hand, to each of the OR logic gates 102 and 103. The one-reset input of the multivibrator 96 is tied to ground. The "kick" switch 19 is connected by way of a diode 110 disposed in series in the blocking direction and by way of a logic inverter 113 to a second input of the OR logic gate 109. The point 114 common to the diode 110 and the logic inverter 113 is tied to positive supply voltage by the intermediary of a resistor 112 to ground via a ZENER diode 111, and finally to an input of each of the two AND logic gates 106 and 108, each commanding the operation of one of the electrovalves 10 and 11, respectively. The noninverting output W of the multiplexer 36 is connected as a third input to the AND logic gate 106 commanding the opening of electrovalve 10, while the inverting output $\overline{W}$ of the multiplexer 36 is connected as second input to the AND logic gate 108 commanding the opening of the second electrovalve 11 by the intermediary of the OR logic gate 107.

The power interface 37 driving the electrovalves 10 and 11 comprises between the outputs of the AND logic gates 106 and 108, respectively, and the excitation windings 10, 11 of the corresponding electrovalves in each case a pair of transistors, one NPN 191 and one PNP 192, of which the first 191 has its emitter grounded and the second 192 has its collector grounded. The first 191 is connected by its base to the output of the logic gate 106 or 108, according to the electrovalve considered, through a resistor. the output at the collector of each transistor 191 is also connected to positive supply voltage through a collector resistor. This collector is connected to the base of the second transistor 192 connected in series via its emitter to the excitation winding of the corresponding electrovalve 10 or 11, across which winding is mounted in parallel a capacitor.

The valve opening characteristic of the electrovalves which is supplied at the outputs $C_1$, $D_1$, $F_1$, $B_2$, $C_2$, $D_2$, $E_2$ of the stage 34 for the multiplexer 36 follows an experimentally established parabolic law. The multiplexer 36 intervenes to select a time of opening different for each of the electrovalves 10 and 11, determined by the value X appearing at the inputs $A_3$ to $C_3$ of the multiplexer, taking account both the absolute value and the sign thereof. The valve opening characteristic can vary from one vehicle to another. Nevertheless, it always exhibits a parabolic shape.

Figure 12:
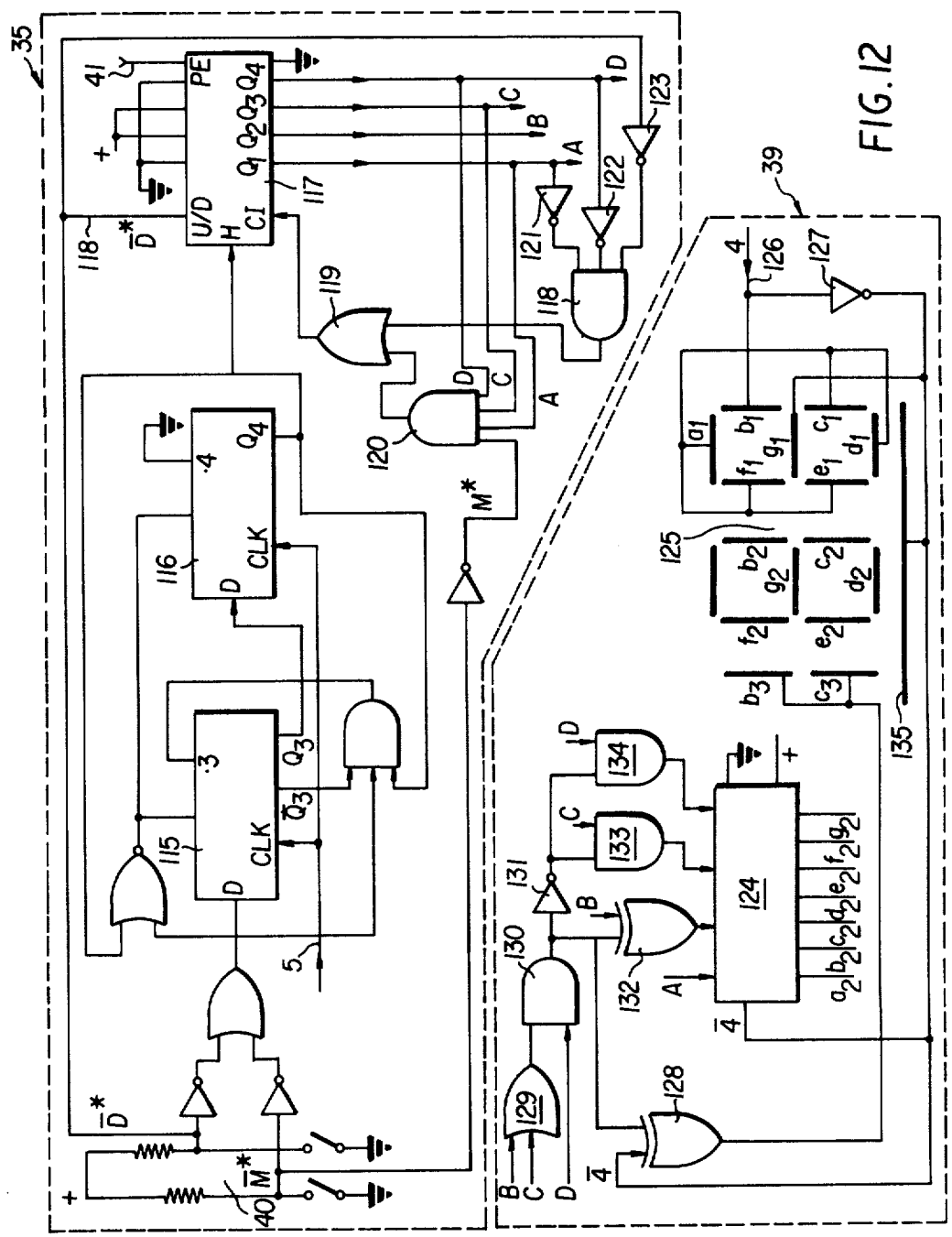
FIG. 12 is a circuit diagram of one embodiment of the electronic circuits of FIG. 2, which are involved in the selection of the limiting speed $V_o$ and in the display.

FIG. 12 illustrates a circuit implementation of the electronic circuits involved in the selection of the limiting speed $V_o$ and the display of this value. It is an application of the sequential command such as that described in the French patent application no. 75/35636 (publication no. 2332656) filed by the present Applicant Nov. 21, 1975 for "Sequential Command of Motor Vehicle Headlights" in which multivibrators 115 and 116 in series serve as the input circuit. A very similar circuit has been described in connection with FIG. 15 of the French patent application no. 76/32563 filed by the present Applicant Oct. 28, 1976 for "Momentary Command of the Electrical Equipment of a Motor Vehicle, in Particular, External Lights". The conductor which carries the signal 5 coming from the output 5 of the counter 48 of FIG. 4 is connected in parallel to the clock inputs of multivibrators 115 and 116 to protect the latter against any parasitics produced by bouncing of the contacts of the momentary two-position switch 40 which the driver operates to display in 39 the desired limiting speed $V_o$.

The multivibrators 115 and 116 which may be of type D each consist of a half-multivibrator of type 4013 and furnish clock pulses with delayed leading and trailing edges to the clock input of a sequencer circuit 117 with (N+1) outputs $Q_1$, $Q_2$, $Q_3$, $Q_4$. The circuit 117 which is an up-down counter may be of type 4516 in the MOTOROLA catalog. This up-down counter is set to six at departure, when voltage is applied to it by application of the signal 41 to its input PE. The counter of circuit 11 is incremented or decremented according to the polarity of the signal $\overline{D}^*$ produced by the righthand switch of the double switch 40 and applied to the input lead 118 in successive amounts up to a maximum value of thirteen or down to a minimum value of six, which permits selecting the value of $V_o$ given in binary at the outputs $Q_1$ to $Q_4$ of this up-down counter 117, this value being represented by the set of binary digits ABCD. This set of binary digits is transmitted to the central calculating and memory unit 33 (FIG. 3) to be stored at the proper time by the lead 81 in the first up-down counter stage 77 (FIG. 5), and likewise transmitted to the appropriate inputs of the liquid crystal display 39 shown in FIG. 8.

The up-down counter 117 also has an inhibiting input designated as CI in the figure which is connected to the output of an OR logic gate 119. The gate 119 has connected at the two inputs thereof the outputs of two AND logic gates 118 and 120, respectively. The logic gate 118 has three inputs respectively connected by the intermediary of logic inverters 121, 122 and 123 to the outputs $Q_1$ and $Q_4$ of the multivibrator 117 and to the signal $\overline{D}^*$ which is also fed to the U/D up-down counting input of the up-down counter 117 via the wire 118, these three inputs being tied to the outputs of the logic inverters 121, 122, and 123, respectively. The logic gate 120 has four inputs, the first three connected directly to the outputs $Q_1$, $Q_3$, $Q_4$ of the multivibrator 117 and the fourth to the signal $\overline{M}^*$ produced by the lefthand switch of the double switch 40. These AND logic gates 118 and 120 inhibit the multivibrator 117 by application of a logic "one" to the CI input of the multivibrator for the extreme values of the count, i.e. the value six for the logic gate 118 and the value thirteen for the logic gate 120, i.e. the extreme values of 60 km/hr and 130 km/hr for $V_o$.

The display is effected by means of a decoder 124 which excites the seven segments a, b, c, d, e, f, g of a liquid crystal device 125. The decoder 124 may be, for example, of type MC 14543 in the MOTOROLA catalog. The liquid crystal display 125 is excited with ac current. That is why the display stage 39 is connected by a lead 126 to the output of stage 4 of the counter 48 to receive from it the signal which by the intermediary of a logic inverter 127 is applied to the "phase" input of the decoder 124 as well as to an input of an EXCLUSIVE OR logic gate 128. The signals B and C from the outputs $Q_2$ and $Q_3$ of the up-down counter 117 are applied to inputs of an OR logic gate 129, the output of which is the first input to an AND logic gate 130 receiving the signal D from the output $Q_4$ of the up-down counter 117 as a second input thereto and the output of which is connected directly to an input of the EXCLUSIVE OR logic gate 128 and to an input of a second EXCLUSIVE OR logic gate 132, and then by the intermediary of a logic inverter 131 as an input to two other AND logic gates 133 and 134. The signal A from the output $Q_1$ of the up-down counter 117 is applied directly to an input of the decoder 124, while logical combination of the signals B, C and D from the outputs $Q_2$, $Q_3$ and $Q_4$, respectively, of the up-down counter 117 are respectively applied as second inputs to the EXCLUSIVE OR logic gate 132 and the AND logic gates 133 and 134. The display arrangement has a counter-electrode 135 excited by the signal $\overline{4}$ while the electrodes $b_3$ and $c_3$ are excited by the signal coming from the EXCLUSIVE OR logic gate 128. The segments $a_1$, $b_1$, $c_1$, $d_1$, $e_1$, $f_1$ are excited by the signal 4 while the segments $a_2$, $b_2$, $c_2$, $d_2$, $e_2$, $f_2$, $g_2$ are excited by the voltages appearing at the corresponding outputs of the decoder 124.

Figure 13:
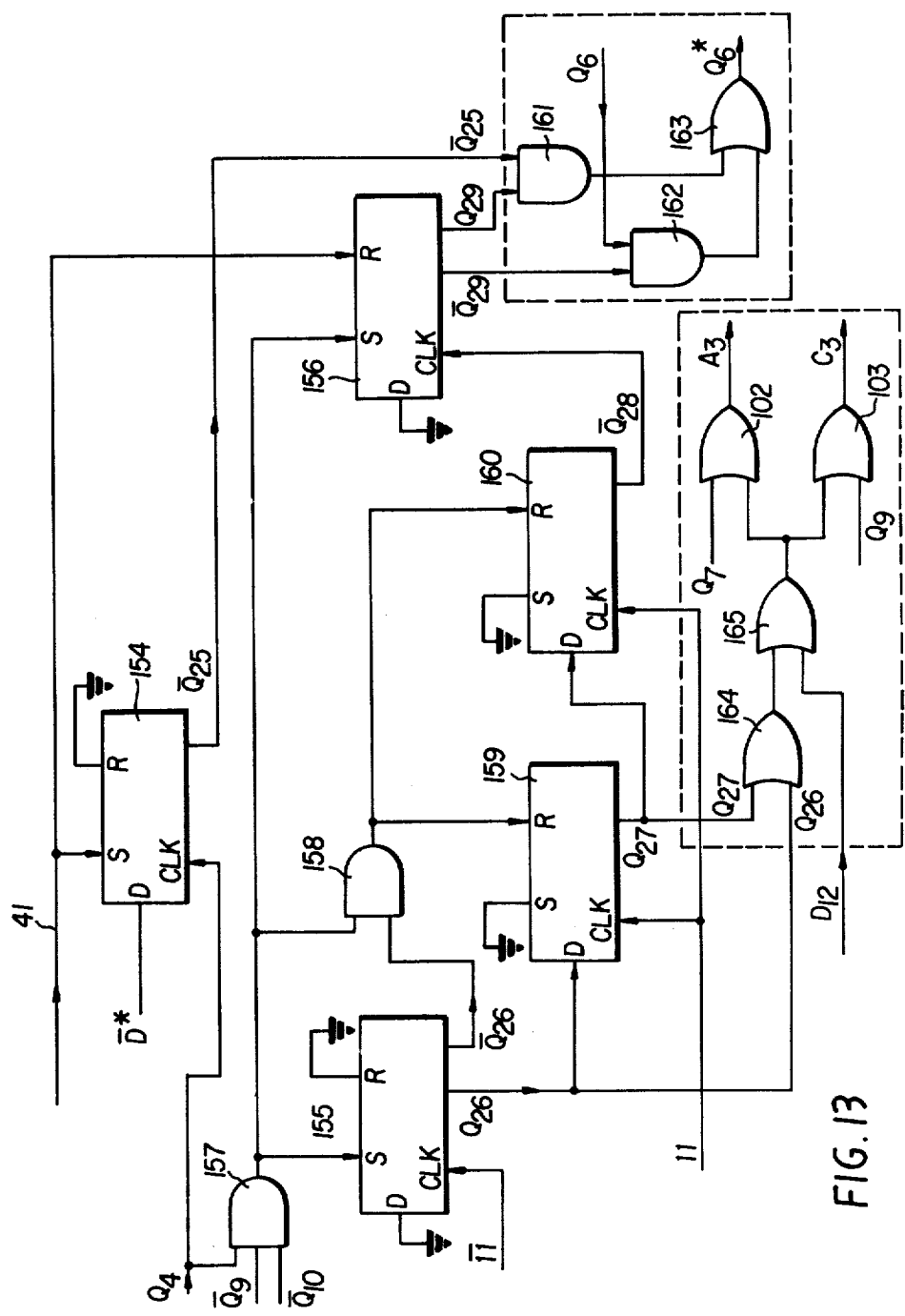
FIG. 13 is a circuit diagram of an embodiment relating to the changing of the ordered speed $V_o$.

FIG. 13 illustrates another embodiment relative for the changing of the ordered speed $V_o$, this embodiment permitting intervention in the result of calculation X and modification of the calculation during two successive calculation periods. This circuit is inserted between the circuit 35 for selecting speed $V_o$, the central calculating unit 33 and the multiplexer 36, this last being shown in FIG. 11.

This circuit of FIG. 13 comprises, firstly, a memory stage for the rise or descent of the sequential command which consists of a type D multivibrator 154 having a reset input 5 tied to a lead 41 carrying the prepositioning signal.

The signal present at the D input of the multivibrator 154 is stored on the rising edge of the clock input thereof connected to the output $Q_4$ of the multivibrator 116 of FIG. 12. Thus, when one presses on the momentary two-position switch 40 and commands the decrease of the ordered speed ($\overline{D}^*=0$), a zero is stored in the multivibrator 154. On the other hand, if one presses on the command to increase ($\overline{M}^*=0$), a "one" is stored in the multivibrator 154.

The circuit of FIG. 13 comprises next a second multivibrator 155 of type D having a one-reset input S thereof connected to the output of a three-input AND logic gate 157. The inputs to gate 157 are the output $Q_4$ of the multivibrator 116 of FIG. 12, and the inverting outputs $\overline{Q}_9$ and $\overline{Q}_{10}$ of the memory 52 for the absolute value of the number X calculated by the central calculating unit 33 shown in FIG. 5. The output of AND logic gate 157 is also connected as an input to an AND logic gate 158 having a second input thereto connected to the inverting output $\overline{Q}_{26}$ of the second multivibrator 155, and to the one-reset input S of a third multivibrator 156 of type D. The second type D multivibrator 155 is connected by its clock input to receive the inverse of the signal from the output of stage 11 of the counter 48 of FIG. 4. The noninverting output $Q_{26}$ of the second multivibrator 155 is connected to the input of a first multivibrator 159 of type D, mounted as a shift register in combination with a second multivibrator 160 likewise of type D, on the one hand, and, on the other, to a first input of an OR logic gate 164 connected by its second input to the noninverting output $Q_{27}$ of the first stage 159 of the shift register 159. The noninverting output $Q_{27}$ is likewise connected to the D input of the second stage 160 of the shift register. The two multivibrators 159 and 160 forming the shift register are connected by the zero-reset inputs R thereof to the output of the AND logic gate 158 and by the clock input thereto to the output of stage 11 of the counter 48 of FIG. 4. The input D of the first multivibrator 154 is connected to one of the output leads of the momentary two-position switch 40 while its inverting output $\overline{Q}_{25}$ is connected to a first input of an AND logic gate 161 tied by its second input to the noninverting output $Q_{29}$ of the third multivibrator 156. The zero-reset input of multivibrator 156 is connected to the lead 41 carrying the prepositioning signal and has the clock input thereof connected to the inverting output $\overline{Q}_{28}$ of the second stage 160 of the shift register. The inverting output $\overline{Q}_{29}$ of the third multivibrator 156 is connected to one input of an AND logic gate 162 connected by a second input thereof to the noninverting output $Q_6$ of the sign memory 51 of the central calculating stage in FIG. 5, and the output of which is connected to a first input of an OR logic gate 163 having a second input connected by the output of the AND logic gate 161. Gate 163 furnishes at the output thereof a new signal $Q_6^*$ for the logic gates 106 and 107 of FIG. 11.

The output of the OR logic gate 164 is connected to a first input of another OR logic gate 165 having a second input connected to the output of the AND logic gate 97 of FIG. 11. The output of gate 165 is applied in parallel to one of the inputs of each of the OR logic gates 102 and 103 already shown in FIG. 11, which have the outputs thereof connected to the inputs $A_3$ and $C_3$, respectively, of the multiplexer 36. The inputs of the AND logic gate 157 which are connected to the outputs $Q_9$ and $Q_{10}$ of the absolute value memory 52 of the central calculating stage shown in FIG. 5 by way of logic inverters permit the limiting of the range of regulation, e.g. $-4<X<+4$, within which the circuit of FIG. 13 operates.

Figure 14:
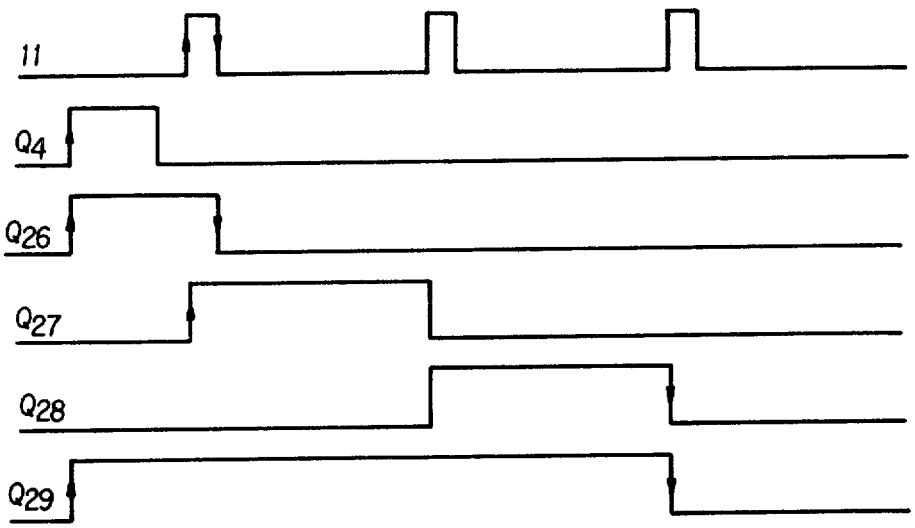
FIG. 14 is a timing diagram of the signals of the circuit of FIG. 13.

FIG. 14 illustrates the essential signals appearing in FIG. 13, and facilitates understanding the operation of the circuit there shown. In FIG. 14 are shown in succession: on line 1, the signal from the output of stage 11 of the counter 48 of FIG. 4; on line 2, the command signal obtained at the output $Q_4$ of the multivibrator 116 of FIG. 12; and on lines 3 to 6, the signals which appear at the noninverting outputs $Q_{26}$, $Q_{27}$, $Q_{28}$ and $Q_{29}$ of the multivibrators 155, 159, 160 and 156, respectively.

The circuit of FIG. 13 functions as follows in the following manner. At each change in $V_o$ resulting from the fact that the driver activates the momentary two-position switch 40, when $|X|<4$, the sign (Q6) is forced during two successive calculation periods so that the result x has the value five during the first calculation period. To this end, there is first stored in the multivibrator 154 the sign of the sequential command, i.e. whether the ordered speed $V_o$ is increased or decreased. When $V_o$ decreases, $\overline{Q}_{25}=1$.

If one is in the range of regulation, $-4<X<4$ determined by the signals $\overline{Q}_9$ and $\overline{Q}_{10}$ at the input of the AND logic gate 157, and if one presses on the sequential command 40, producing emission of a signal $Q_4$, this signal $Q_4$ forces the multivibrator 155 and 156 to one. The multivibrator 155 returns to zero at the falling edge of the signal 11 following the return to zero of the signal $Q_4$, as shown by the signals on lines 1, 2 and 3 of FIG. 14. The signal $Q_{26}$ generated by the multivibrator 155 is stored successively in the multivibrators 159 and 160 mounted as a shift register as shown by the signals on lines 4 and 5 of FIG. 14. Finally, the multivibrator 156 which has been forced to one by the signal $Q_4$ returns to zero at the falling edge of the signal $Q_{28}$ generated by the multivibrator 160 as shown by the signals on the last two lines of FIG. 14.

Thus the sign $Q_6$ is forced to become $Q_6^*$ by the set of logic gates 161, 162, 163 of FIG. 13 during two elemental periods of calculation so that there is an immediate reaction on the command of the electrovalves without waiting for the new result X corresponding to the new ordered speed selected.

The inputs $A_3$ and $C_3$ of the multiplexer 36 represented in FIG. 11, if they are both at high level, will be forced to five by the set of logic gates 164, 165, 102 and 103 of FIG. 13, either at the first regulation by $D_{12}$ coming from the logic gate 97 in FIG. 11, or by the multivibrators 155 and 159 at the first period following the sequential command of $V_o$ by $Q_4$.

Figure 15:
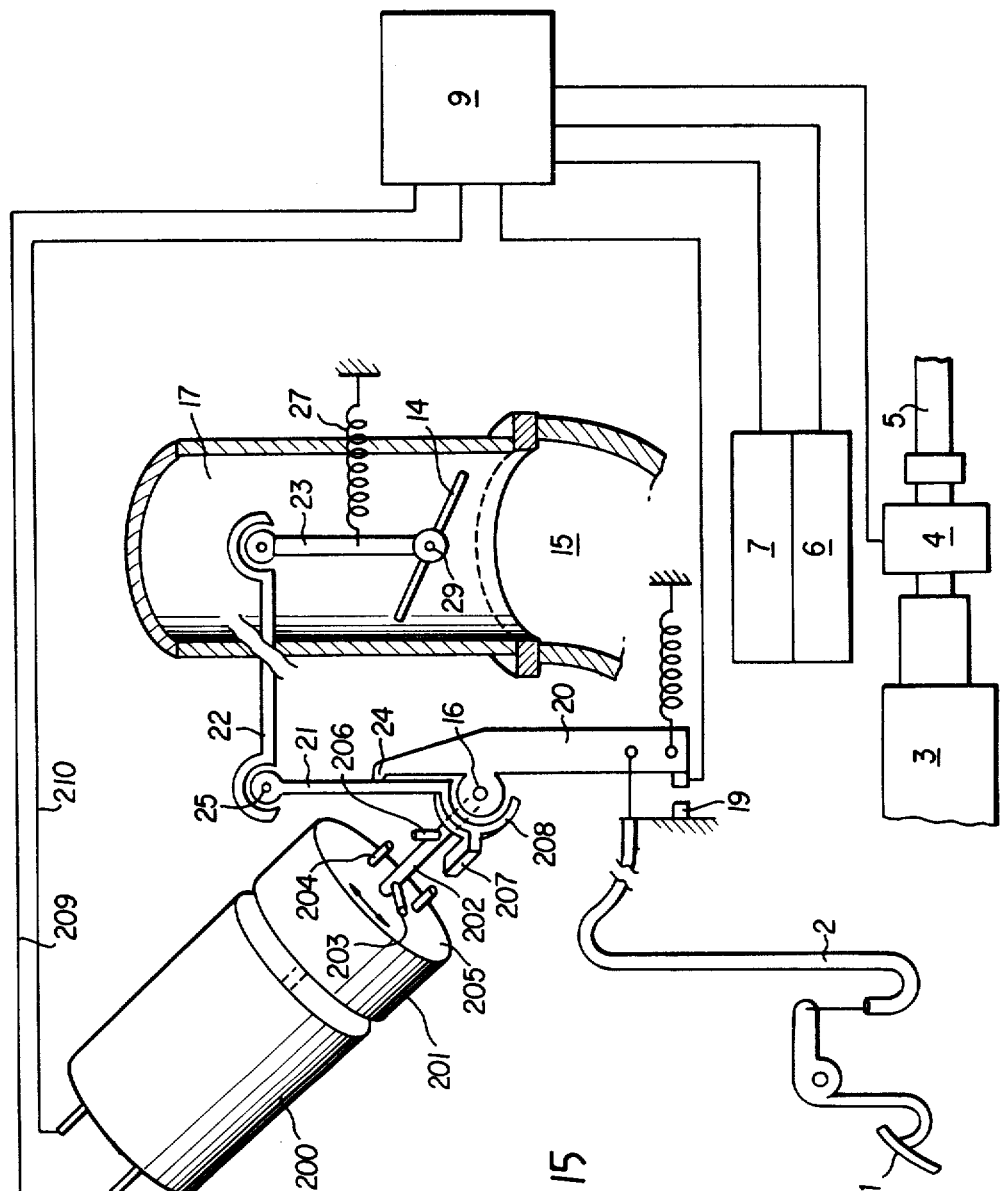
FIG. 15 is a schematic illustration of another embodiment of the speed-limiting system of the invention; and, FIG. 16 is a circuit diagram of an electronic circuit for controlling the reversible motor of the embodiments shown in FIG. 15.
Figure 16:
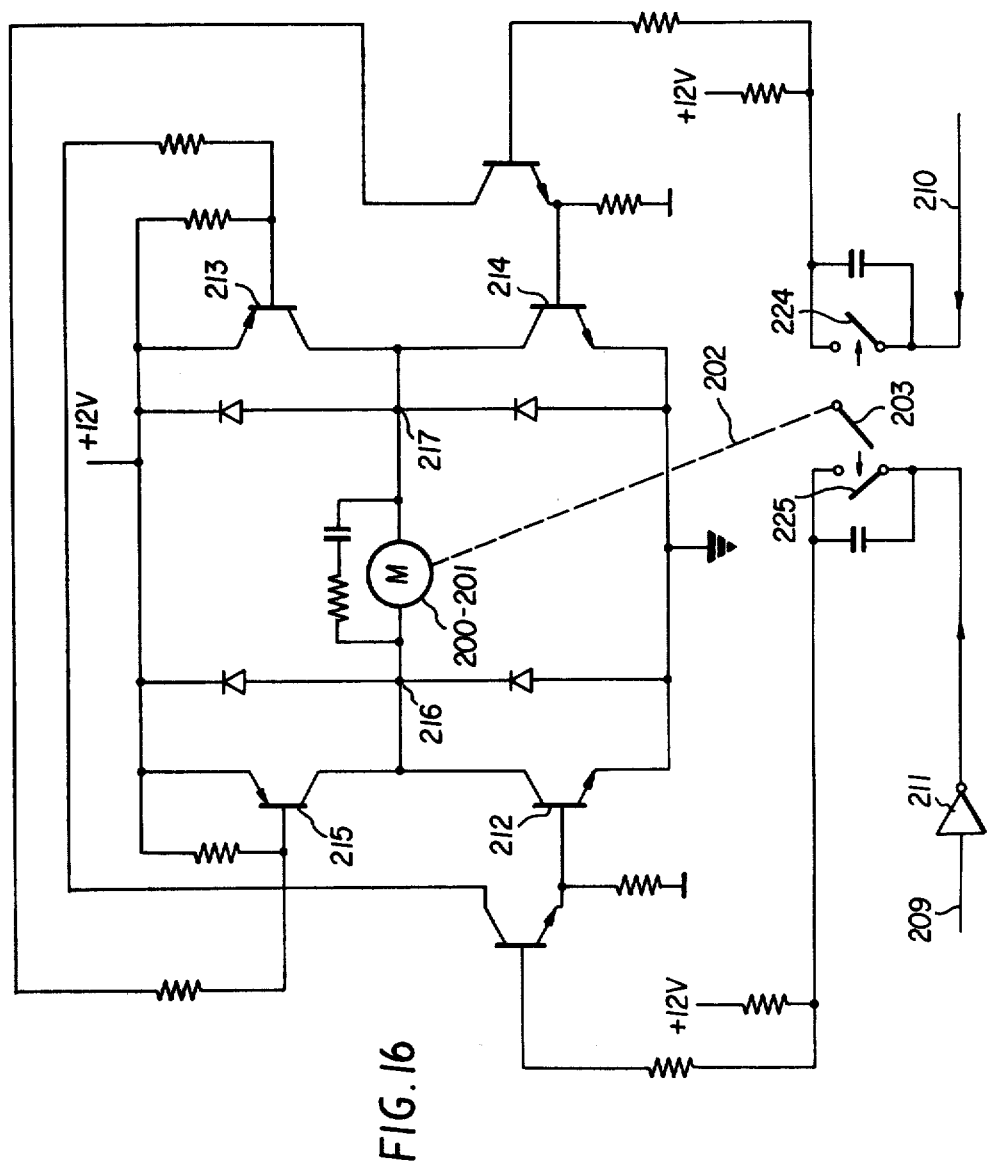

In a second embodiment of the vehicle speed-limiting system of the invention, shown in FIGS. 15 and 16, the actuator 13, the first electrovalve 11 for connection to a vacuum tank 8 and the second electrovalve 10 for venting to the open air shown in FIG. 1, are replaced by a reversible dc motor-reducer commanded by the computer 9 and intervening via a lug turning with its shaft in the second kinematic chain tying the shaft 16 to the throttle 14 by the intermediary of a second lever 21, the link 22 and the control arm 23.

According to the embodiment of FIG. 15, the accelerator pedal 1 of a vehicle is tied by a cable 2 to one end of a first lever 20 pivoting about an axis 16 and terminated at its other end by a point 24 resting against a second lever 21. Lever 21 has a ball 25 on one end and an articulation support 208 at its other end thereof conforming to the shape of the first lever 20 in the vicinity of the axis 16 in such a manner that it too can pivot about the axis 16. The end of the first lever 20 tied to the cable 2 is returned to its equilibrium position by means of a first spring 26.

The first kinematic chain is continued by a link 22 terminated at its two extremities by articulation supports taking the shape internally, on the one hand, of the ball 25 and, on the other, of the end of a control arm 23. The control arm 23 by its rotations about an axis 29 situated at the height of its second extremity, commands the openings and closings of the throttle 14. The control arm 23 is returned to its equilibrium and rest position by means of a second spring 27 which tends to open the throttle 14. The kinematic chain thusly described, going to the axis 29 from the accelerator pedal 1, is completely outside of the air intake passage 17 containing the throttle 14. The air intake passage 17 has been represented in cross section along its longitudinal plane of symmetry to show the low pressure region 15 resulting from the opening of the throttle downstream of the carburetor which again has not been shown.

According to the embodiment shown in FIG. 15 of the present invention, the articulation support 208 of the second lever 21 which conforms to the shape of the first lever 20 in the vicinity of the axis 16 in such a manner as to be able likewise to pivot about the axis 16, is integral with an acceleration return stop 207 having an L-shape and situated in a plane perpendicular to the plane of FIG. 15. A reversible motor 200 is equipped with a reducer 201, represented in loose perspective in FIG. 15, which have a common axis 202 which coincides with the axis 16. This common axis 202 is integral with an entrainment stop 206 which can come into contact with the acceleration return stop 207 and entrain the latter in rotation when the reversible motor 200 and its associated reducer 201 function. This common axis 202, in addition, is integral with an end-of-travel stop 203 which because of the entrainment of the motor 200–201, in one direction or the other, can come into contact with one 204 or the other 205 of two motor end-of-travel stops mounted on the outside of the motor housing.

In FIG. 16 there is represented a transistor drive circuit for the motor 200, 201, which is to serve only as an example for the specialist desiring to reconstruct the invention completely. Thus, FIG. 16 shows the rotating shaft 202, and the moving stop 203 integral with the shaft 202 opening either an end-of-travel switch 225 corresponding to the stop 205 or an end-of-travel switch 224 corresponding to the stop 204, depending on the sense of rotation of the motor 200. Antiparasitic capacitors are connected in parallel with the end-of-travel switches 225 and 224. The end-of-travel switch 224 is connected on one side to the lead 210 coming from the computer 9, which in FIG. 1 is connected via this lead to the vacuum electrovalve 11, while the end-of-travel switch 225 is connected on one side by way of an inverter 211 to the lead 209 from the computer 9 which in FIG. 1 corresponds to the connection via this lead to the venting electrovalve 10.

The second kinematic chain comprising the motor 200 and its reducer 201, the return stop 207 integral with the articulation support 208 forming part of the second lever 21, the link 22 and the control arm 23 is capable, under the command of the computer 9, to take over from the first kinematic chain defined above to oblige the driver of the vehicle to respect the speed limit displayed in his vehicle. The computer 9 can be grounded by the intermediary of the "kick" switch 19 otherwise known as the accelerator pedal flooring switch or the speed limit defeat switch. This switch 19 is again located on the floor of the vehicle separating the motor and passenger compartments. The computer 9 is tied, in addition, to the order selector 7, the on-off switch 6 and the speed sensor 4 geared to the transmission 3 of the vehicle. Similarly, the cable 5 again ties the speed sensor 4 to the vehicle's speedometer.

The motor rotation control circuit of FIG. 16 may be entirely enclosed in the housing of the motor 200 represented in FIG. 15. This motor is, as an example, a reversible dc motor-reducer the angle of rotation of which is a function of the time during which current is supplied to it. Thus, it is capable of turning in steps of 0.5° minimum and through an angle of 90° in 0.8 second maximum.

Assuming that an order for rotation of the motor 200 and its associated reducer 201 arrives from the computer 9 via the lead 210, two results are possible, according to opening or closing of switch 224, i.e. depending upon whether or not the motor via its shaft 202 and its end-of-travel stop 203 has already come into contact with its fixed end-of-travel stop 205. In the first case, switch 224 open, nothing happens. In the second case, switch 224 closed, the complementary transistors 214 and 215 are powered so that the potential at the motor terminals at point 216 is greater than the potential at point 217. The motor turns in the counterclockwise sense and, if it continues to be commanded, it continues turning until it reaches the end-of-travel stop 204 and opens the associated end-of-travel switch 224 in which case the transistors 214 and 215 no longer conduct and the motor stops. Operation is identical in the case where the motor is commanded by the computer 9 via the lead 209, the complementary transistors 212, 213 conducting in the case where the end-of-travel switch 225 is closed. In this case the motor turns in the opposite direction. There will be noted in FIG. 16 between the motor terminals 216 and 217 an antiparasitic series connection of a resistor and capacitor.

It is within the capability of the specialist to replace the dc motor with a stepping motor operating on pulses supplied by the computer 9, one pulse corresponding for instance to a rotation of 0.5° and a train of 180 pulses corresponding to an angle of rotation of 90°. To each result X given by the computer 9 there corresponds a train of a determined number of pulses.

The end-of-travel switches 224 and 225 associated with the mechanical end-of-travel stops 204 and 205 may be dispensed with in case simulated "electronic switches" are incorporated within the computer 9. These correspond to predetermined values of the calculation X carried out by the computer 9 outside the range of its values retained for the case of normal operation. If, for example, values of +8 and −8 are chosen as corresponding to the fictitious "electronic switches", the fact that the computer 9 furnishes as the result of three consecutive calculations a value at least equal to +8 has the effect of forcing the result of the calculation to zero and, therefore, stopping the motor. This result being achieved, the calculation result continues to be forced to zero as long as no change in polarity of the calculation result is detected. Only a change in polarity interrupts the process of "forcing" to zero and permits starting up the motor in the opposite direction. The same happens with the second "electronic switch" corresponding to the value minus 8.

The computer 9 described in the present application may be replaced by a programmed microcomputer commanding both the opening of the electrovalves 10 and 11, or the rotation of the motor 200, and the display of the ordered speed $V_o$. The microcomputer receives the signals coming from the speed sensor 4, the sequential command pulses 35 for selection of ordered speed $V_o$ and the command pulses involved in a system collecting signals for external limitation of the speed of the vehicle. On this subject, reference can be made to the French patent application no. 73/33812 cited above which illustrates in FIG. 2 a sensor of known type capable of receiving a signal of ordered speed $V_{1e}$ from an emitter outside the vehicle as well as from a speed ordering element provided on the vehicle dashboard associated with a means of command inside the vehicle, such as a push-button keyboard, and thus able to accept both an internal ordered speed $V_{1i}$ and an external ordered speed $V_{1e}$ by the intermediary of a radio receiver. With regard to the microcomputer, it is noted that such should be programmable by one skilled in the art in accordance with the information given in the description of the realization in integrated circuits in the present application with the help of the attached drawings. A microcomputer of type 8021 derived from the 8048 of the INTEL Company is suitable for the realization of the invention.

The computer of the invention can also function in conjunction with a raised-foot arrangement such as has been described and illustrated in French patent application no. 74/29404 filed Aug. 28, 1974 as certificate of first addition to French patent application No. 73/33812 already cited. In such a raised-foot arrangement, the actuator 13 acts by the intermediary of a cable attached directly to the accelerator pedal 1 to raise the latter according to orders from the computer 9 putting the pneumatic actuator 13 more or less in communication with either the vacuum source 8 or the atmosphere by way of the electrovalves 11 and 10. This means of return comprises also a depressible system containing a compression spring preloaded to 4 daN for example as illustrated in FIG. 2 of the certificate of French patent first edition no. 74/29404, a system which can be attached to the floor of the vehicle. The action of the actuator is thus limited in effort to a value easily exceeded if the driver so desires.

Finally, the ordered speed $V_o$ may also be chosen, according to the present invention, not only by the command system 35 at the disposition of the driver, but also, with priority or not, by a straightforward arrangement of automatic reception of limiting speed signals tied to the road, as for instance the TUFFET system which consists of inserting ferrite rods at suitable places and furnishing the vehicles with magnetic responders sensitive to the presence of the rods.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent in the United States is:

1. In a speed limiter system for use in the regulation of the speed of an internal combustion engine having a manual acceleration pedal coupled to a throttle and an air intake manifold coupled to motor cylinders, said system utilizing a computer in association with a servo system, a speed sensor and a shaping circuit for shaping signals produced by the speed sensor, said computer containing a time base and a generator circuit producing and distributing a plurality of command and synchronization signals to a central processing unit, to an ordered speed selector circuit, and to a circuit adjusting the opening of at least two electrovalves governing the pressure within a pneumatic actuator coupled to said throttle, said electrovalves respectively tied to a vacuum prevailing in the air intake manifold of the motor cylinders and to open air at atmospheric pressure, as a function of said ordered speed $V_o$, a speed $V_2$ at an instant t, a speed $V_1$ at a prior instant t−1, the computer periodically adding to the change in instantaneous speed $(V_2−V_1)$ in a preceding unit of time, the variation $(V_2−V_o)$ of speed $V_2$ with respect to ordered speed $V_o$ so that the computer periodically adjusts the value of the pressure within the actuator in acting on the degree of opening of a first electrovalve connected to a vacuum tank and the degree of opening of a second electrovalve for venting to the open air as a function of the measured speed of the motor and of the variation in motor speed, the improvement comprising:

said computer comprising means for periodically performing the calculation $$a[b(V_2-V_1)+(V_2-V_o)]+c$$

where a and b are predetermined coefficients and c is either a fixed value or zero depending on whether or not the instantaneous speed variation $(V_2−V_1)$ has remained greater than zero during two successive time periods; and means for adjusting the value of the pressure within said actuator by controlling the openings of the said first electrovalve connected to a vacuum tank and the said second electrovalve for venting to the open air according to a parabolic law and as a function of the result of the periodically performed calculations.

2. A speed limiter system for a vehicle according to claim 1, having means for simultaneous display of the ordered speed $V_o$ in front of the driver by the intermediary of the computer, further comprising:

a momentary two-position switch permitting sequential selection of the ordered speed $V_o$ within a predetermined range to prefix the ordered speed $V_o$ to an initial value and to prohibit speeds beyond two extreme lower and upper values of said predetermined range.

3. A speed limiter system for a vehicle according to claim 2, further comprising:

a speed sensor for determining speed $V_2$;

a sequence command circuit for selection of the ordered speed $V_o$; and the computer comprising a programmed microcomputer commanding both the opening of the electrovalves and the display of the ordered speed $V_o$, said computer connected at the inputs thereof to the $V_2$ speed sensor and the sequential command circuit for selection of the ordered speed $V_o$.

4. A speed limiter system according to claim 3 wherein said throttle is manually operable by means of an acceleration pedal, further comprising:
- a first kinematic linkage between the accelerator pedal and the throttle and comprising first and second levers, said first lever coupled to the pedal and pivoting about an axis, said first lever having a point resting against one side of said second lever, said second lever terminated at one end by a ball and at another by an articulation support permitting said second lever to turn about said axis of said first lever;
- a second kinematic train comprising a pneumatic actuator having a movable wall coupled to said throttle by means of said first and second levers, pressurization of said actuator determined by actuation of said electrovalves under the control of said computer;
- wherein the mechanical connections between the accelerator and throttle, on the one hand, and the actuator and throttle, on the other, are realized in such a manner that the accelerator pedal having given the throttle a certain opening, the actuator has the capability of acting on the said throttle in the closing direction under the command of the computer as soon as the vehicle has entered the range of regulation by decoupling the first kinematic chain tying the accelerator pedal to the throttle and substituting the second kinematic chain for regulation by the pneumatic actuator under the control of the computer.

5. Speed limiter system for a vehicle according to claim 3, further comprising means for detecting a first passage of the result of the calculation from a negative value to a positive value and from the moment when the result of the calculation has passed a value lower than a certain given negative value, means which induces said computer to force the second sum calculation to $d=5$ during a predetermined number of elemental periods.

6. A speed limiter system for a vehicle according to claim 1, further comprising:
- a "kick" switch coupled to the accelerator at the end of its travel and acting to inhibit the computer.

7. In a speed limiter system for use in the regulation of the speed of an internal combustion engine having a manual acceleration pedal coupled to a throttle in an air intake manifold coupled to motor cylinders, said system utilizing a computer in association with a servo system, a speed sensor and a shaping circuit for shaping signals produced by said speed sensor, said computer containing a time base and a generator circuit producing and distributing a plurality of command and synchronization signals to an ordered speed selector circuit and a means for regulating throttle position as a function of a selectable ordered speed $V_o$, a speed $V_2$ occuring at an instant t, a speed $V_1$ occuring at a prior instant $t-1$, the improvement comprising:
- a first kinematic linkage between said pedal and said throttle comprising first and second levers, said first lever coupled to said pedal and pivoting about an axis, said first lever having a point resting against one side of said second lever, said second lever terminated at one end by a ball and at another end by an articulation support permitting said second lever to turn about said axis of said first lever;
- a second kinematic linkage under the control of the computer by means of said command and synchronization signals, said second kinematic linkage capable of controlling throttle opening while neutralizing said first kinematic linkage to said throttle manually controlled by said pedal, said second kinematic linkage comprising a reversible motor controlled by said computer and coupled to said first and second levers, said motor having a rotation axis coinciding with the axis of rotation common to the first and second levers said articulation support of said second lever having an L-shaped acceleration return stop disposed in such a manner as to be able to come into contact with an entrainment stop integral with the motor rotation axis, said reversible motor receiving its command orders from the said digital computer.

8. A speed limiter system according to claim 7 wherein the axis of said motor further comprises:
- a motor housing;
- an end-of-travel stop integral with said motor rotation axis;
- two fixed end-of-travel stops integral with said motor housing;
- two end-of-travel electrical switches coupled to said end-of-travel stops to inhibit further rotation of said motor upon contact between said motor axis stop with either of said motor housing stops.

9. A speed limiter system for a vehicle according to claim 8, wherein the end-of-travel electrical switches are replaced by simulated "electronic switches" within the computer.

* * * * *